US008124143B2

(12) United States Patent
de Barros et al.

(10) Patent No.: US 8,124,143 B2
(45) Date of Patent: Feb. 28, 2012

(54) ANTHOCYANIN PIGMENT/DYE COMPOSITIONS THROUGH CORN EXTRACTION

(75) Inventors: Regina Celia Bertoldo de Barros, Minneapolis, MN (US); Michele Ann French, Saint Paul, MN (US); Frederic John Rigelhof, Maple Grove, MN (US); Lee Kent French, Lamberton, MN (US)

(73) Assignee: Suntava, LLC, Aftan, MN (US)

( * ) Notice: Subject to any disclaimer, the term of this patent is extended or adjusted under 35 U.S.C. 154(b) by 742 days.

(21) Appl. No.: 12/214,774

(22) Filed: Jun. 20, 2008

(65) Prior Publication Data
US 2008/0319053 A1  Dec. 25, 2008

Related U.S. Application Data

(60) Provisional application No. 60/945,430, filed on Jun. 21, 2007.

(51) Int. Cl.
*A61K 36/899* (2006.01)
*A61K 36/00* (2006.01)

(52) U.S. Cl. ............... 424/750; 424/776; 424/725
(58) Field of Classification Search .................. None
See application file for complete search history.

(56) References Cited

U.S. PATENT DOCUMENTS

| | | | | |
|---|---|---|---|---|
| 4,302,200 A | 11/1981 | Yokoyama et al. | | 8/438 |
| 4,320,009 A | 3/1982 | Hilton et al. | | 210/651 |
| 4,452,822 A | 6/1984 | Shrikhande | | 426/49 |
| 4,481,226 A | 11/1984 | Crosby et al. | | 426/540 |
| 4,500,556 A | 2/1985 | Langston | | 426/540 |
| 4,581,847 A | 4/1986 | Hibberd et al. | | 800/268 |
| 4,769,061 A | 9/1988 | Comai | | 504/206 |
| 4,810,648 A | 3/1989 | Stalker | | 435/191 |
| 4,940,835 A | 7/1990 | Shah et al. | | 800/288 |
| 4,975,374 A | 12/1990 | Goodman et al. | | 435/183 |
| 5,134,074 A | 7/1992 | Gordon et al. | | 435/412 |
| 5,266,317 A | 11/1993 | Tomalski et al. | | 424/93.2 |
| 5,384,253 A | 1/1995 | Krzyzek et al. | | 800/292 |
| 5,550,318 A | 8/1996 | Adams et al. | | 800/300.1 |
| 5,591,616 A | 1/1997 | Hiei et al. | | 435/469 |
| 5,789,214 A | 8/1998 | Ryals et al. | | 800/288 |
| 5,858,742 A | 1/1999 | Fraley et al. | | 435/468 |
| 5,877,023 A | 3/1999 | Sautter et al. | | 435/419 |
| 5,886,244 A | 3/1999 | Tomes et al. | | 800/293 |
| 5,990,387 A | 11/1999 | Tomes et al. | | 800/293 |
| 6,767,999 B2 | 7/2004 | Smirnov et al. | | 536/18.5 |
| 6,822,144 B1 | 11/2004 | Zhao et al. | | 800/320.1 |
| 2005/0125915 A1* | 6/2005 | Ichi et al. | | 8/438 |

FOREIGN PATENT DOCUMENTS

| | | |
|---|---|---|
| EP | 0 333 033 | 9/1989 |
| EP | 1477530 | 11/2004 |
| WO | WO 93/02197 | 2/1993 |
| WO | PCT/US93/06487 | 7/1993 |
| WO | WO94/00992 | 1/1994 |
| WO | WO95/16776 | 6/1995 |
| WO | WO95/18855 | 7/1995 |
| WO | WO96/30530 | 10/1996 |

OTHER PUBLICATIONS

Aoki H, Kuze N, Kato Y. 2002 Anthocyanins isolated from purple corn (Zea mays L.) Foods and Food Ingredients J. Japan 199:41-5.*
Abdel-Aal, E-S, Young, J.C., Rabalski, I. 2006 Anthocyanin Composition in Black, Blue, Pink, Purple, and Red Cereal Grains. J. Agric. Food Chem. 54; 4696-4704.*
Russo, Julee and Sheila Lukins. "The New Basics Cookbook," copyright 1989, published by Workman Publishing Company, Inc. New York, NY, pp. 230 and 233.*
H. F. Ng, W. F. Wilcke & R. V. Morey, J. P. Lang. "Machine Vision Evaluation of Corn Kernel Mechanical and Mold Damage"vol. 41(2):415-420; 1998 American Society of Agricultural and Biological Engineers, www.asabe.org.
Junxiong Mang, Yi Xun, Wei Li, "Identification and Detection for Surface Cracks of Corn Kernel Based on Computer Vision" , 2007 American Society of Agricultural and Biological Engineers (ASAE Annual Meeting, 073090, www.asabe.org.
G. Mazza, E. Miniati; "Anthocyanins in Fruits, Vegetables, and Grains", pp. 227-230, 242-243; 1993 CRC Press.
General Anthocyanin Structure, http://www.micro-ox.com/chem_antho.htm.
Monica Giusti & Ronald Wrolstad; "Characterization and Measurement of Anthocyanins by UV-Visible Spectroscopy", John wiley & Sons, Inc. 2001.
Onica Giusti, Ronald Wrolstad; "Acylated Anthocyanins from Edible Sources and Their Applications in Food Systems", Journal 14, pp. 217-225, Biochemical Engineering Journal 2003.
Bolivar Cevalloe-Casals, Luis Cisneros-Zevallos; "Stability of Anthocyanin-based Aqueous Extracts of Andean Purple Corn and Red-fleshed Sweet Potato Compared to Synthetic and Natural Colorants"; Food Chemistry 86 pp. 69-77, Food Chemistry 2004.
Romina Pedreschi, Luis Cisneros-Zevallos; Phenolic Profiles of Andean Purple Corn (Zea mays L.); Food Chemistry 100 pp. 956-963, Food Chemistry 2007.
"Purple Corn Extract Powder", http://www.detoxyourworld.com/acatalog/purple_com.html.
"The Potential Health Benefits of Purple Corn", Herbal Gram 2005; The Journal of the American Botanical Council Issue: 65, 46-49; http://www.herbalgram.org/iherb/herbalgram/articleview.asp?a=2779.

(Continued)

*Primary Examiner* — Chris R Tate
*Assistant Examiner* — Russell Fiebig
(74) *Attorney, Agent, or Firm* — Mark A. Litman & Associates, P.A.

(57) ABSTRACT

Anthocyanin pigments/dyes are extracted from corn kernels by adding corn kernels with less than 5% by weight of corn kernels comprising broken kernels to an aqueous medium to form an aqueous-corn medium. The corn kernels have in excess of 0.1 mg of anthocyanin pigment/dye per gram of corn kernel therein. The anthocyanin pigment/dye in the corn kernels has greater than 40% by weight of anthocyanin as an acid or acylated form of the anthocyanin. The aqueous corn medium is agitated at a temperature above 35° C. The solid corn kernels are separated from the aqueous corn medium to form an extract of anthocyanin in aqueous medium having less than 1.0% solids therein before concentration or purification steps are performed on the extract.

26 Claims, 2 Drawing Sheets

OTHER PUBLICATIONS

P. Jing, M.M. Guisti; "Effects of Extraction Conditions on Improving the Yield and Quality of an Anthocyanin-Rich Purple Corn (Zea mays L.) Color Extract", Journal of Food Science vol. 00. Nr. 0. 2007.

Yolanda Salina Moreno, David Rubio Henandez, Antonia Biaz Velazquez; "Extraccion y Uso de Pigmentos del Grano de Maiz (Zea Mays L.) Como Colorants en Yogur", (includes English translation of Summary); Official publication of Sociedad Latinoamericans de Nutricion. http://www.alanrevista.org/ediciones/2005-3/pigmentos_maiz_colorants_yogur.asp.

Burpee Review, Corn Ruby Queen Hybrid (SE); http://www.burpee.com/product/vegetables/corn/corn+ruby+queen+hybrid+-+1+pkt.+(2008).

"Pigment Extraction by Whole Kernel Infusino Method—Laboratory Procedure" Suntava LLC Rev Jan. 3, 2008.

\* cited by examiner

Individual anthocyanin and chromatograms

| peak no. | $t_R$ | [M+](m/z) | MS/MS(m/z) | anthocyanin | Individual antho percentage | | |
|---|---|---|---|---|---|---|---|
| | | | | | 07-4112 | 07-4113 | Peruvian Corn |
| 1 | 10.7 | 449 | 287 | cyanidin 3-glucoside | 13.7 | 25.7 | 43.1 |
| 2 | 17.7 | 535 | 287 | cyanidin 3-(6"-malonoyl)galactoside | 7.2 | 5.2 | 1.7 |
| 3 | 20.7 | 463 | 301 | peonidin 3-glucoside | 2.5 | 3.4 | 5.7 |
| 4 | 24.4 | 535 | 287 | cyanidin 3-(6"-malonoyl)glucoside | 38.1 | 42.4 | 31.6 |
| 5 | 30.6 | 621 | 287 | cyanidin 3-(malonoyl)(malonoyl)galactoside | 4.3 | 2.8 | 1.4 |
| 6 | 32.2 | 519 | 271 | pelargonidin 3-(malonoyl)glucoside | 4.0 | 2.0 | 2.7 |
| 7 | 33.6 | 621 | 287 | cyanidin 3-(malonoyl)(malonoyl)glucoside | 13.4 | 7.6 | 2.1 |
| 8 | 35.8 | 549 | 301 | peonidin 3-(malonoyl)galactoside | 5.5 | 4.2 | 4.4 |
| 9 | 36.8 | 549 | 301 | peonidin 3-(malonoyl)glucoside | 3.5 | 3.1 | 4.3 |
| 10 | 38.5 | 605 | 271 | pelargonidin 3-(malonoyl)(malonoyl)glucoside | 2.0 | 0.6 | 0.4 |
| 11 | 39.0 | 635 | 287 | cyanidin 3-(malonoyl)(succinoyl)galactoside | 2.1 | 1.1 | 0.9 |
| 12 | 39.5 | 635 | 301 | peonidin 3-(malonoyl)(malonoyl)glucoside | 2.0 | 0.8 | 0.5 |
| 13 | 39.9 | 635 | 287 | cyanidin 3-(malonoyl)(succinoyl)glucoside | 1.2 | 0.6 | 0.7 |
| 14 | 40.6 | 563 | 301 | peonidin 3-(succinoyl)glucoside | 0.5 | 0.3 | 0.6 |

FIGURE 1

ANTHOCYANIN PIGMENT/DYE COMPOSITIONS THROUGH CORN EXTRACTION

RELATED APPLICATIONS DATA

This application claims continuation-in-part application status under 35 U.S.C. 120 from co-pending Provisional U.S. Patent Applications Ser. No. 60/945,430 filed 21 Jun. 2007.

BACKGROUND OF THE ART

1. Field of the Invention

The present invention relates to the field of naturally occurring colorants and chemicals from plants, including genetically modified and cross-pollinated plants, the provision of colorant and chemicals from plants having high levels of specifically desirable colorants and chemicals, and particularly to corn species that provide significant levels of anthocyanins in products from the corn.

2. Background of the Art

Polyphenols are those compounds which comprise more than one phenolic group. Among the polyphenols are the following classes: flavonoids (a term often used to denote polyphenols in general, but more commonly in Europe to denote only the flavones), the flavanols, proanthocyanidins (also called procyanidols, procyanins, procyanidins and tannins) and anthocyanins.

The flavones are compounds with a basis structure in which two benzene rings (A and B) are linked with a heterocyclic six member ring C containing a carbonyl ring. Ring B can be joined in position 2 to give a flavone or to position 3 to give an iso-flavone. Hydroxylation can occur at positions 3, 5, 7, and 3', 4', 5' to give compounds called flavonols. Typical examples of flavonols are: quercetin (hydroxylated at positions 3, 5, 7, 3', 4'), kaempferol (hydroxylated at positions 3, 5, 7, 4') and myricetin (hydroxylated at positions 3, 5, 7, 3', 4', 5'). They can exist naturally as the aglycone or as O-glycosides (e.g. D-glucose, galactose, arabinose, rhamnose, etc). Other forms of substitution such as methylation, sulfation and malonylation are also found.

The two most common flavanols are catechin (hydroxyl group positions 5, 7, 3', 4') and its stereo-isomer epicatechin. The hydroxyl groups can be esterified with gallic acid. The proanthocyanidins are polymers of catechin and/or epicatechin and can contain up to 8 units or more. These compounds are often called proanthocyanidins, procyanidins or tannins.

The anthocyanins are colored substances, sometimes called anthocyanidins. Typical examples are: cyanidin (hydroxylated at positions 3, 5, 7, 3', 4'), delphinidin (hydroxylated at positions 3, 5, 7, 4', 5') and pelargonidin (hydroxylated at positions 3, 5, 7, 3'). The hydroxyl groups are usually glycosylated and/or methoxylated (e.g. malvidin at 3', 5'). Within the general term, "polyphenols" are compounds including the dihydroxy-or-tri-hydroxy benzoic acids and the phytoalexins, a typical example of which is resveratrol.

The goal of field crop breeding is to combine various desirable traits in a single variety/hybrid. Such desirable traits include greater yield, better stalks, better roots, resistance to insecticides, herbicides, pests, and disease, tolerance to heat and drought, reduced time to crop maturity, better agronomic quality, higher nutritional value, uniformity in germination times, stand establishment, growth rate, maturity and fruit size.

Breeding techniques take advantage of a plant's method of pollination. There are two general methods of pollination: self-pollination and cross-pollination. A plant self-pollinates if pollen from one flower is transferred to the same or another flower of the same plant. A plant cross-pollinates if pollen comes to it from a flower on a different plant.

Corn plants (Zea mays L.) can be bred by both self-pollination and cross-pollination. Both types of pollination involve the corn plant's flowers. Corn has separate male and female flowers on the same plant, located on the tassel and the ear, respectively. Natural pollination occurs in corn when wind blows pollen from the tassels to the silks that protrude from the tops of the ear shoot.

Plants that have been self-pollinated and selected for type over many generations become homozygous at almost all gene loci and produce a uniform population of true breeding progeny, a homozygous plant. A cross between two such homozygous plants produces a uniform population of hybrid plants that are heterozygous for many gene loci. Conversely, a cross of two plants each heterozygous at a number of loci produces a population of hybrid plants that differ genetically and are not uniform. The resulting non-uniformity makes performance unpredictable.

The development of uniform corn plant hybrids requires the development of homozygous inbred plants, the crossing of these inbred plants, and the evaluation of the crosses. Pedigree breeding and recurrent selections are examples of breeding methods used to develop inbred plants from breeding populations. Those breeding methods combine the genetic backgrounds from two or more inbred plants or various other broad-based sources into breeding pools from which new inbred plants are developed by selfing and selection of desired phenotypes. The new inbreds are crossed with other inbred plants. The hybrids from these crosses are evaluated to determine which of those have commercial potential.

North American farmers plant tens of millions of acres of corn at the present time, and there are extensive national and international commercial corn breeding programs. A continuing goal of these corn breeding programs is to develop corn hybrids that are based on stable inbred plants and have one or more desirable characteristics. To accomplish this goal, the corn breeder must select and develop superior inbred parental plants.

Published U.S. Patent Application 20080047028 (Cook) provides seed and plants of the corn variety designated CV414351. The invention thus relates to the plants, seeds and tissue cultures of the variety CV414351, and to methods for producing a corn plant produced by crossing a corn plant of variety CV414351 with itself or with another corn plant, such as a plant of another variety. The invention further relates to corn seeds and plants produced by crossing plants of variety CV414351 with plants of another variety, such as another inbred line. The invention further relates to the inbred and hybrid genetic complements of plants of variety CV414351. Low levels of anthocyanins are reported.

U.S. Pat. No. 6,767,999 (Smirnov et al.) describes anthocyanin colorant made from corn pulp and a process for its production which relates to food, cosmetic, pharmaceutical and textile industries and which may be used in coloring edible or ingestible products. The components percentage shall be as follows: cyanidin glycoside 0.1-8.6%; peonidin glycoside 0.08-6.45%; pelargonidin glycoside 0.005-4.3%; organic substances and mineral salts are the remaining materials. Due to the fact that the colorant solution contains pelargonidin glycoside further to cyanidin and peonidin glycosides, the proposed colorant obtained expanded the color spectrum. Combination of these three anthocyanins in the proposed colorant provides for a rich spectrum of red colors. The colorant retains red color when pH of the environment is not more than 7. It is thermostable, photostable and maintains its properties during two years. Besides, its relative optical density is the highest when it is subjected to the light with wavelength of 505-515 nm. According to the invention, process of the colorant production implies that pre-dried vegetable maize-pulp containing anthocyanins is ground, extracted by a mix of aqueous solutions of hydrochloric and citric acids in the field of ultrasonic vibration. Then the extracted coloring matter is filtered and concentrated in vacuum. The primary material is additionally prepared for extraction by infusion of grinded (ground) material in extracting agent during 6-8 hours at the temperature of 35-40° C. Extraction may be performed in three steps. Processing for extraction of each lot shall be 30-40 minutes at the temperature of 35-40° C. The process makes the production technology easier and provides for additional source of primary materials.

Various processes have been developed for the extraction of anthocyanins from fruits, vegetables and grains, especially from grapes. Various methods have been developed to extract polyphenols from grape skins, especially from red or black grapes, since the anthocyanin pigment is used as a colorant in foods.

Yokoyama et al. (U.S. Pat. No. 4,302,200) discloses a process for extracting anthocyanin-type color from natural products (grapes) which includes contacting the natural product with a sulfite ion-containing aqueous solution at a temperature of about 85° C. or higher.

Hilton et al. (U.S. Pat. No. 4,320,009) discloses a process for obtaining anthocyanin pigment extracts in which large quantities of anthocyanin extract may be obtained from grape skin residue from wine fermentation.

Shrikhande (U.S. Pat. No. 4,452,822) discloses a process for improvements in the production of anthocyanin coloring material from red grape pomace or other anthocyanin sources using extraction with sulfur dioxide.

Crosby et al. (U.S. Pat. No. 4,481,226) discloses a stabilized anthocyanin grape extract colorant. The stabilized product is made by combining tannic acid and anthocyanin grape extract colorant in an appropriate solvent and recovering the product.

Langston (U.S. Pat. No. 4,500,556) discloses a process for obtaining anthocyanin colorant by extraction from grape pomace. The method described in Langston is to contact grape pomace with $HSO_3$ to form a complex. The complex is recovered by treating the liquid extract phase with a non-ionic adsorbent to adsorb the complex.

SUMMARY OF THE INVENTION

Corn kernels having anthocyanin and phenolics present therein are treated without substantial crushing of kernels to provide an extract having relatively high concentrations of acid or acylated anthocyanins. 1. Preferred corn breeds have been selectively developed for producing large quantities of anthocyanins that can have greater than 50% of all anthocyanins extracted with greater than 55% acylation; 2. By appropriate selection of corn breeds, including several varieties from Peru, more than ten anthocyanins can be provided in commercially useful amounts from a single extraction process.

A process is enabled for extracting at least anthocyanin pigments/dyes of high purity from corn kernels to produce a pigment extract having improved stability against hydrolysis and increased heat and light stability. The process is performed by a) adding corn kernels with less than 10% by weight comprised of broken kernels to an aqueous medium to form an aqueous-corn medium; b) the corn kernels typically having in excess of 0.1 mg of anthocyanin pigment/dye per gram of corn kernel therein; c) the anthocyanin pigment/dye in the corn kernel having greater than 55% by weight of anthocyanin as an acid or acylated form of the anthocyanin; d) exposing the aqueous corn medium at a temperature above 35° C. (preferably with agitation); e) separating solid corn kernels from the aqueous corn medium and forming an extract of anthocyanin in aqueous medium and f) concentrating the extract to provide an anthocyanin composition having greater than 55% acid or acylated form of anthocyanin. The extract before concentration should have a pH of less than or equal to 4.5. The extract may be provided free of any acids or salts (e.g., acid salts, which unless otherwise stated are included within the term "acids") other than those extracted or formed from corn kernels. The extract may be provided free of any bases other than those extracted or formed from the corn kernels. The anthocyanin pigment/dye in the corn kernel may have greater than 70% by weight of anthocyanin as an acid or acylated form of the anthocyanin and the extract is concentrated to provide an anthocyanin composition having greater than 70% acid form of anthocyanin.

Anthocyanin pigments/dyes are extracted from corn kernels by adding corn kernels with less than 10% and preferably less than 5% by weight comprised of broken kernels to an aqueous medium to form an aqueous-corn medium. The corn kernels have in excess of 0.1 mg of anthocyanin pigment/dye per gram of corn kernel therein. The anthocyanin pigment/dye in the corn kernels preferably has greater than 30% or greater 40% by weight of anthocyanin as an acid or acylated form of the anthocyanin. The aqueous corn medium is agitated at a temperature above room temperature, such as above about 35° C. The solid corn kernels are separated from the aqueous corn medium to form an extract of anthocyanin in aqueous medium having preferably less than 1.0% solids therein before concentration or purification steps are performed on the extract.

BRIEF DESCRIPTION OF THE FIGURES

FIG. 1 is a table of anthocyanin content in various corn species.

DETAILED DESCRIPTION OF THE INVENTION

Figure 2:
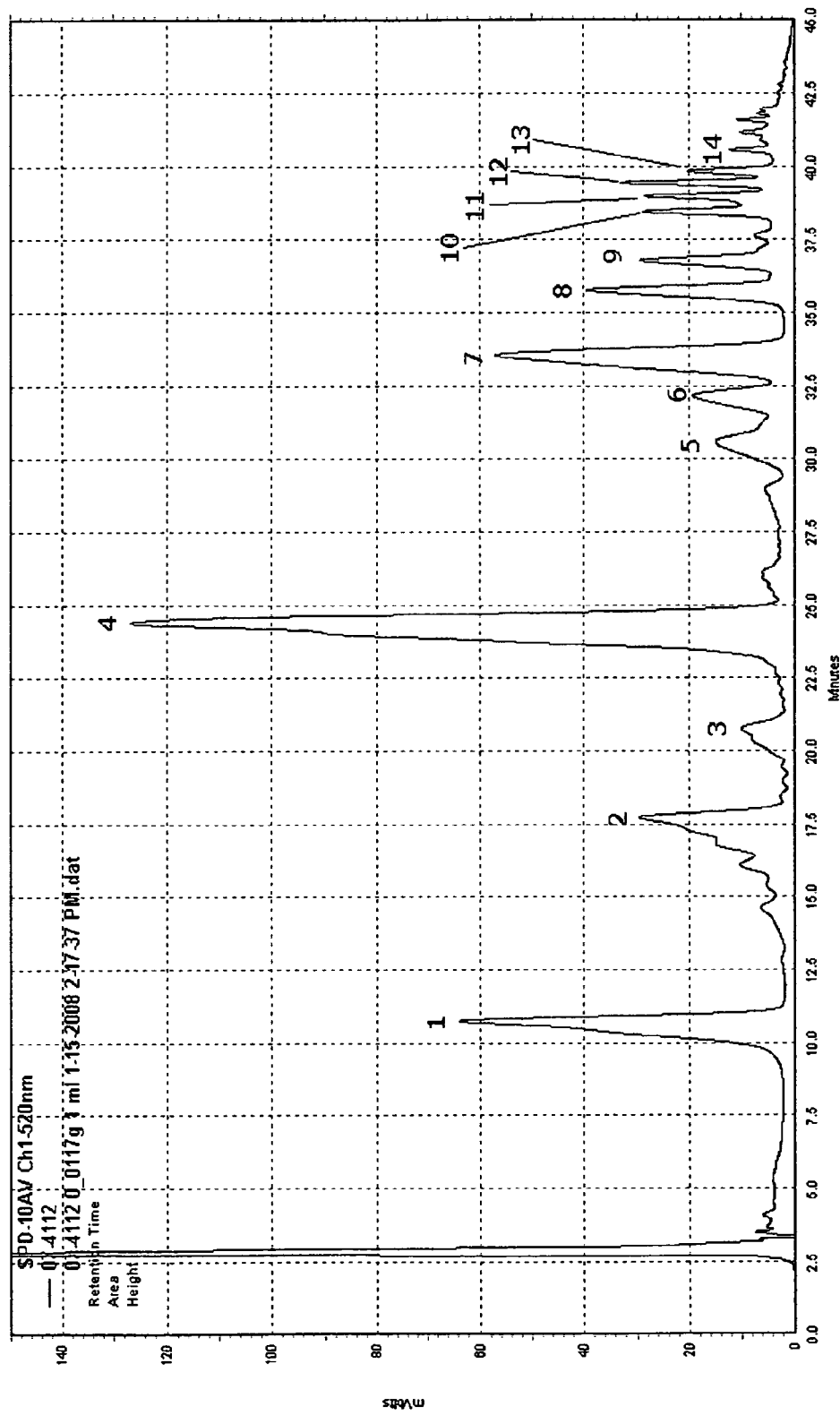
FIG. 2 is a chromatogram of anthocyanins obtained from an extract of a certain corn variety.

Anthocyanin pigments/dyes are extracted from corn kernels by adding corn kernels with less than 10% and preferably less than 5% by weight comprised of broken kernels to an aqueous medium to form an aqueous-corn medium. The corn kernels have in excess of 0.1 of anthocyanin pigment/dye per gram of corn kernel therein. The anthocyanin pigment/dye in the corn kernels has greater than 40% by weight of anthocyanin as an acid or acylated form of the anthocyanin. The preferred input weight of 40-50% of starting raw material solids in the aqueous medium is preferably agitated at a temperature above 35° C. The solid corn kernels are separated from the aqueous corn medium to form an extract of anthocyanin in aqueous medium having less than 1.0% solids therein before concentration or purification steps are performed on the extract.

In the process, the anthocyanin may have greater than 55% by weight of anthocyanin as an acid or acylated form of the anthocyanin and the extract has less than 1.0% solids therein. Where the extract is a first extract from the kernels, it may contain less than 5% by weight of the total starch originally in the kernels and greater than 25% by weight of all anthocyanin originally in the kernels, as later described in detail. The unbroken kernels may not have pericarp/seed coat removed there from and the starch endosperm in at least 90% of the kernels is not directly exposed to the aqueous medium.

The following definitions are provided as an aid to understanding the detailed description of the present invention.

The phrases "coding sequence," "coding region," "structural sequence," and "structural nucleic acid sequence" refer to a physical structure comprising an orderly arrangement of nucleotides. The nucleotides are arranged in a series of triplets that each form a codon. Each codon encodes a specific amino acid. Thus, the coding sequence, structural sequence, and structural nucleic acid sequence encode a series of amino acids forming a protein, polypeptide, or peptide sequence. The coding sequence, structural sequence, and structural nucleic acid sequence may be contained within a larger nucleic acid molecule, vector, or the like. In addition, the orderly arrangement of nucleotides in these sequences may be depicted in the form of a sequence listing, figure, table, electronic medium, or the like.

The phrase "codon degeneracy" refers to divergence in the genetic code permitting variation of the nucleotide sequence without affecting the amino acid sequence of an encoded polypeptide. Accordingly, the instant invention relates to any nucleic acid fragment comprising a nucleotide sequence that encodes all or a substantial portion of the amino acid sequences set forth herein. The skilled artisan is well aware of the "codon-bias" exhibited by a specific host cell in usage of nucleotide codons to specify a given amino acid. Therefore, when synthesizing a nucleic acid fragment for improved expression in a host cell, it is desirable to design the nucleic acid fragment such that its frequency of codon usage approaches the frequency of preferred codon usage of the host cell.

The term "cDNA" refers to a double-stranded DNA that is complementary to and derived from mRNA.

The phrases "DNA sequence," "nucleic acid sequence," and "nucleic acid molecule" refer to a physical structure comprising an orderly arrangement of nucleotides. The DNA sequence or nucleotide sequence may be contained within a larger nucleotide molecule, vector, or the like. In addition, the orderly arrangement of nucleic acids in these sequences may be depicted in the form of a sequence listing, figure, table, electronic medium, or the like.

"Expression" refers to the transcription of a gene to produce the corresponding mRNA and translation of this mRNA to produce the corresponding gene product (i.e., a peptide, polypeptide, or protein).

"Expression of antisense RNA" refers to the transcription of a DNA to produce a first RNA molecule capable of hybridizing to a second RNA molecule, which second RNA molecule encodes a gene product that is desirably down-regulated.

As used herein, "gene" refers to a nucleic acid fragment that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different than that found in nature. "Endogenous gene" refers to a native gene in its natural location in the genome of an organism. An "exogenous gene" or "transgene" refer to a non-native gene that has been introduced into the genome by a transformation procedure.

"Hemizygous" refers to a diploid individual having only one copy of a particular gene (for example, because a chromosome has been lost). "Homozygous" refers to a gene pair having identical alleles in two homologous chromosomes.

"Heterologous" refers to the relationship between two or more nucleic acids or protein sequences that are derived from different sources. For example, a promoter is heterologous with respect to a coding sequence if such a combination is not normally found in nature. In addition, a particular sequence may be "heterologous" with respect to a cell or organism into which it is inserted (i.e., does not naturally occur in that particular cell or organism).

"Homology" refers to the level of similarity between two or more nucleic acid or amino acid sequences in terms of percent of positional identity (i.e., sequence similarity or identity). Homology also refers to the concept of similar functional properties among different nucleic acids or proteins.

"Hybridization" refers to the ability of a first strand of nucleic acid to join with a second strand via hydrogen bond base pairing when the two nucleic acid strands have sufficient sequence complementarity. As used herein, a nucleic acid molecule is said to be the "complement" of another nucleic acid molecule if they exhibit complete complementarity. As used herein, molecules are said to exhibit "complete complementarity" when every nucleotide of one of the molecules is complementary to a nucleotide of the other. Thus two nucleic acid strands are said to have sufficient complementarity when they can hybridize to one another with sufficient stability to permit them to remain annealed to one another under appropriate conditions.

The phrases "marker-assisted selection" or "marker-assisted breeding" refer to the use of genetic markers to identify and select plants with superior phenotypic potential. Genetic markers determined previously to be associated with a trait locus or trait loci are used to uncover the genotype at trait loci by virtue of linkage between the marker locus and the trait locus. Plants containing desired trait alleles are chosen based upon their genotypes at linked marker loci.

The phrase "breeding population" refers to a genetically heterogeneous collection of plants created for the purpose of identifying one or more individuals with desired phenotypic characteristics. The term "phenotype" refers to the observed expression of one or more plant characteristics.

A "genetic marker" is any morphological, biochemical, or nucleic acid based phenotypic difference which reveals a DNA polymorphism. Examples of genetic markers include but are not limited to RFLPs, RAPDs, allozymes, SSRs, and AFLPs.

The phrase "marker locus" refers to the genetically defined location of DNA polymorphisms as revealed by a genetic marker. A "trait locus" refers to a genetically defined location for a collection of one or more genes (alleles) which contribute to an observed characteristic.

The phrase "restriction fragment length polymorphism" (RFLP) refers to a DNA-based genetic marker in which size differences in restriction endonuclease generated DNA fragments are observed via hybridization (Botstein et al., Am. J. Hum. Genet., 32:314-331 (1980)).

The phrase "random amplified polymorphic DNA" (RAPD) refers to a DNA amplification based genetic marker in which short, sequence arbitrary primers are used and the resulting amplification products are size separated and differences in amplification patterns observed (Williams et al., Nucleic Acids Res., 18:6531-6535 (1990)).

The phrase "simple sequence repeat" (SSR) refers to a DNA amplification-based genetic marker in which short stretches of tandemly repeated sequence motifs are amplified and the resulting amplification products are size separated and differences in length of the nucleotide repeat are observed (Tautz, Nucleic Acids Res., 112:4127-4138 (1989)).

The term "AFLP" refers to a DNA amplification-based genetic marker in which restriction endonuclease generated DNA fragments are ligated to short DNA fragments which facilitate the amplification of the restricted DNA fragments (Vos et al., Nucleic Acids Res., 23:4407-4414 (1995)). The amplified fragments are size separated and differences in amplification patterns observed.

The phrase "operably linked" refers to the functional spatial arrangement of two or more nucleic acid regions or nucleic acid sequences. For example, a promoter region may be positioned relative to a nucleic acid sequence such that transcription of the nucleic acid sequence is directed by the promoter region. Thus, a promoter region is "operably linked" to the nucleic acid sequence.

As used herein, the term "plant" includes whole or entire plants and parts thereof. Such exemplary plant parts may include plant cells, plant protoplasts, plant cell tissue cultures, plant calli, plant clumps, plant cell suspension cultures, and plant protoplasts. Also included within the definition of the term "plant" are plant cells present in plants or parts of plants, e.g., zygotes, embryos, embryonic organs, pollen, ovules, flowers, seeds, ears, cobs, leaves, husks, stalks, roots, root tips, anthers, and silks.

The terms "promoter" or "promoter region" refer to a nucleic acid sequence, usually found upstream (5') to a coding sequence that is capable of directing transcription of a nucleic acid sequence into mRNA. The promoter or promoter region typically provides a recognition site for RNA polymerase and the other factors necessary for proper initiation of transcription. As contemplated herein, a promoter or promoter region includes variations of promoters derived by inserting or deleting regulatory regions, subjecting the promoter to random or site-directed mutagenesis, and the like. The activity or strength of a promoter may be measured in terms of the amounts of RNA it produces, or the amount of protein accumulation in a cell or tissue, relative to a second promoter that is similarly measured.

The phrase "3' non-coding sequences" refers to nucleotide sequences located downstream of a coding sequence and include polyadenylation recognition sequences and other sequences encoding regulatory signals capable of affecting mRNA processing or gene expression. The polyadenylation signal is usually characterized by affecting the addition of polyadenylic acid tracts to the 3' end of the mRNA precursor. The use of different 3' non-coding sequences is exemplified by Ingelbrecht et al., Plant Cell, 1:671-680 (1989).

"Translation leader sequence" or "5' untranslated region" or "5'-UTR" all refer to a nucleotide sequence located between the promoter sequence of a gene and the coding sequence. The 5'-UTR is present in the fully processed mRNA upstream of the translation start sequence. The 5'-UTR may affect processing of the primary transcript to mRNA, mRNA stability, or translation efficiency. Examples of translation leader sequences have been described (Turner and Foster, Molecular Biotechnology, 3:225(1995)).

"RNA transcript" refers to the product resulting from RNA polymerase-catalyzed transcription of a DNA sequence. When the RNA transcript is a perfect complementary copy of the DNA sequence, it is referred to as the primary transcript or it may be a RNA sequence derived from posttranscriptional processing of the primary transcript and is referred to as the mature RNA. "Messenger RNA" (mRNA) refers to the RNA that is without introns and that can be translated into polypeptide by the cell. "Sense RNA" refers to an RNA transcript that includes the mRNA and so can be translated into a polypeptide by the cell. "Antisense RNA" refers to an RNA transcript that is complementary to a target mRNA, resulting in specific RNA: RNA duplexes being formed by base pairing between the antisense RNA substrate and the target mRNA.

"Recombinant vector" refers to any agent by or in which a nucleic acid of interest is amplified, expressed, or stored, such as a plasmid, cosmid, virus, autonomously replicating sequence, phage, or linear single-stranded, circular single-stranded, linear double-stranded, or circular double-stranded DNA or RNA nucleotide sequence. The recombinant vector may be derived from any source and is capable of genomic integration or autonomous replication.

"Regulatory sequence" refers to a nucleotide sequence located upstream (5'), within, or downstream (3') with respect to a coding sequence. Additionally, introns may have regulatory activity. Transcription and expression of the coding sequence is typically impacted by the presence or absence of the regulatory sequence.

"Substantially homologous" refers to two sequences that are at least about 90% identical in sequence, as measured by the CLUSTAL W method in the Omiga program, using default parameters (Version 2.0; Accelrys, San Diego, Calif.).

"Substantially purified" refers to a molecule separated from substantially all other molecules normally associated with it in its native state. More preferably, a substantially purified molecule is the predominant species present in a preparation. A substantially purified molecule may be greater than about 60% free, preferably about 75% free, more preferably about 90% free, and most preferably about 95% free from the other molecules (exclusive of solvent) present in the natural mixture. The phrase "substantially purified" is not intended to encompass molecules present in their native state.

The term "transformation" refers to the introduction of nucleic acid into a recipient host. The term "host" refers to bacteria cells, fungi, animals or animal cells, plants or seeds, or any plant parts or tissues including plant cells, protoplasts, calli, roots, tubers, seeds, stems, leaves, seedlings, embryos and pollen.

The terms "seeds" and "kernels" are understood to be equivalent in meaning. The term kernel is frequently used in describing the seed of a corn or rice plant. In all plants the seed is the mature ovule consisting of a seed coat, embryo, and in plants of the present invention, an endosperm.

Generally, Fruits and Vegetables are made up of water, carbohydrates, lipids, proteins, amino acids, vitamins, minerals, organic acids, pectins, pectic enzymes, pigments (including tannins) and odorous compounds.

Pigments found in fruits and vegetables such as carotenoids, chlorophylls, anthocyanins and anthoxanthins provide color. These are the natural color pigments that stain or color the skin when the pigments are applied on the skin. Products that can use the pigments include lipsticks, lip stains, cheek stains, blush, eye makeup such as eye liner, eye shadow, mascara, eyebrow powder/pencil, sheer to full coverage foundation, bronzer, highlighter and sunblock among other cosmetic and dermatological products. The use of the color pigment from fruits and vegetables for cosmetic and dermatological purposes such as staining lips, flushing cheeks, enhancing eyes eliminates the use of synthetic colorants such as FD&C colors which are commonly used to color cosmetics. Previously, pigments have been from coal or insects and minerals. The fruit or vegetable in its natural state can be used by rubbing it onto the skin or the fruit or vegetable pigment can be extracted to color or stain the skin directly or can be added into a base of traditional cosmetic products (with or without the aid of FD&C colors) for easier spreadability. For example, a traditional lipstick base of waxes and oils can be produced without the use of FD&C colors and using the fruit or vegetable pigments to stain the lips. The fruit or vegetable can be dried into a powder and then added into formulas. The fruit or vegetable can be in an extracted state and the pigment taken from an extract of the fruit or vegetable. The fruit or vegetable can be added to any already existing formula or new formula. No special technique is needed to use the new type of skin coloring pigment. The benefits of using fruit or vegetable pigments go beyond coloring, enhancing and/or staining the skin to also delivering vitamins and antioxidants.

To appreciate the impact of the present technology on the processes, materials, products and by-products, some discussion of the technology in relation to the art is necessary.

In all processes that have been found to date in the literature for the extraction of anthocyanin dyes from agricultural products, and especially from corn, a main emphasis has been on the extraction of maximum quantities of the anthocyanin. This intent is automatically addressed by crushing and grinding the corn to maximize exposure of the surface area of the entire corn mass to extracting liquids to speed up and maximize extraction. Also, strong chemically based extraction agents are used, such as strong acidic solutions. These techniques that are commonly practiced have numerous disadvantageous effects. Significant waste materials are created in the process and these waste materials must be disposed of with considerable additional expense. The corn mash by-product has value that is far reduced from the original corn itself, as many chemicals and nutrients have been removed from the corn along with the extraction of the anthocyanins. The anthocyanin extracts are produced with a higher than desirable level of impurities because of the aggressive extraction process. The anthocyanin extract must be purified to remove both organic (e.g., carbohydrates, sugars and proteins) and inorganic (e.g., strong acids and their salts) impurities if a commercial anthocyanin product is to be sold from the extraction. These are only some of the economic and technical disadvantages of the existing commercial and published processes for production of anthocyanins from agricultural products, and especially from corn.

Another potential disadvantage of the prior art procedures is that by using chemical extracting agents in the processes certain commercial designations, such as Organic, may not be applied to the anthocyanin concentrate, and therefore their use in subsequent products could eliminate the potential for those subsequent products for being labeled as "organic." The nature of the regulations on such labeling is that the total weight of materials in a final product has to be the result of maximum percentages of individual materials that can be certified as Organic. Therefore, the use of non-Organic materials is cumulative in the assessment of a final product. By providing another standard ingredient (e.g., dye or pigment) that may be certified as Organic (as in the case of products according to the present technology), the stress on other ingredients is reduced in achieving Organic labeling status.

The ability to legally characterize products according to the present technology as "organic" and other legal notifications is both an important product characterization as well as a commercially significant ability. These characterizations are known, according to USDA rules 7 CFR Part 205; Federal Register, Vol. 65, No. 246, 21 Dec. 2000) as:

"100% Organic" or "Certified Organic" means that all of the substances, ingredients, processing aids and food additives, including colors and flavors, are certified organic.

"Organic" means that only 95% of the ingredients must be organic, leaving the remaining 5% open to "allowable" substances from the USDA's National List of Allowed substances and include such things as:

Synthetic substances allowed in organic crop production.

Synthetic inert ingredients as classified by the EPA for use with non-synthetic substances or synthetic substances used as an active allowed crop or livestock pesticide ingredient.

Non-synthetic substances prohibited for use in organic crop, livestock production and processing.

Synthetic substances allowed for use in organic livestock production.

Non-agricultural (non-organic and both non-synthetic and synthetic) substances allowed as ingredients in or on processed products labeled as "organic" or "made with organic (specified ingredients or food group(s))."

Non-organically produced agricultural products allowed as ingredients in or on processed products labeled as organic or made with organic ingredients.

"Made with organic ingredients" means that only 70% of the ingredients have to be organic. The other 30% contain non-organic ingredients and synthetic substances normally allowed in conventional food and fiber production. Products with less than 70% organic ingredients have to list only the organic ingredients on the ingredient panel rather than the primary panel.

The term "certified organic" as used in the present application means any product that meets the legal standards for use of that term on any product according to U.S. USDA regulations 7 CFR Part 205; Federal Register, Vol. 65, No. 246, 21 Dec. 2000). Although standards for this term may differ throughout the world, the definition in the claims of this Patent is according to these official U.S. standards.

In the practice of the present technology, the entire kernel/seed may be introduced into the non-aggressive water-based or water-only extraction process. The resulting corn seed by-product (after extraction) has the appearance of an unextracted kernel or seed, with slightly reduced color level, and still retains the majority of all nutrients. For this reason, the resulting corn seed by-product (after extraction) can be marketed as corn at a much higher value than ground by-products of prior art processes. The color of the final product remains "red" or "purple" because the amount of anthocyanin extracted yields significantly lower soluble residues as to maintain the tone, if not the intensity of the original color of the corn. In addition, because of the potential of using corn varieties with higher anthocyanin concentration, the weight of anthocyanin extracted as compared to the weight of the starting material can remain about the same or even increase, without destruction of the corn kernel. This maximizes the economic benefits of the present technology.

The technical improvements in the practice of the present technology, in producing a more pure anthocyanin product, produce further economic benefits. The direct extract may be sold commercially with simple concentration of the extract without any need for further purification steps. The levels of some carbohydrates (which are water soluble) in the extract are reduced because the interior of the kernel is not directly exposed to the extracting liquid, since the kernel is not broken. Typical anthocyanin extraction results show that less than 4% of total original starch is removed with whole kernel extraction and less than 6% of total protein is extracted from the corn kernels in extracting 30% or more of total anthocyanin from the kernels. In general, a characterization of a preferred embodiment of the present process can be described as whole kernel (less than 10% having the starch endosperm directly exposed to the environment) extraction in a water-based process in which at least 30% by weight of total anthocyanin is extracted and less than 6% of total starch and less than 8% of total protein is extracted from the total kernel mass. Preferably these values, individually or collectively, will be 100% by weight of extracting liquid is water, at least 30% by weight of total anthocyanin is extracted and less than 3% of total starch and less than 5% of total protein is extracted from the total kernel mass in the total extraction from the kernel.

It is important to note that the increased purity of the actual extract is highly significant. Purification processes tend to be high capital and material costs in chemical manufacturing processes. The fact that a direct filtered extract, with no additional purification, can be provided as a commercial product is a significant technical and economic benefit. The low concentration of impurities enables direct use of the extract, with little more than concentration (evaporation of water) needed to raise the color content (color units per volume) of the extract. As an example, one particular corn variety (FAR601) was extracted following the water extraction procedure and yielded 1.1 mg of anthocyanin per gram of corn kernel for first and second combined extracts and 0.7 mg of anthocyanin per gram of corn kernel for the first extract only. The % solids of the above filtered extracts were only 0.66% for the first extract and 0.46% for both extracts combined.

The same is true for providing health and dietary supplements and cosmetic additives because of the antioxidant properties of the anthocyanins. Because the major impurities of the extracted solution are the starches and other components from the corn, the product is directly usable in food products without any need for further treatment and may be labeled as such. An example of a particular corn variety (FAR045*044)(FAR601) subjected to the same water extraction procedure and concentrated to a lower water content, yielded a final product with twice the amount of color per unit of volume. Surprisingly, the total % solids were still only about 60% due to the low solids in the filtered extracts. The corn varieties described herein as FAR045 and FAR601) are described in copending U.S. patent applications, Ser. Nos. 12/143,079; and 12/143,159, filed 20 Jun. 2008, titled "CORN INBREDS LIKE FAR601 AND HYBRIDS THEREOF" and "CORN HYBRIDS LIKE FAR043 AND HYBRIDS THEREOF," which are incorporated herein by reference in their entireties.

It is also of commercial interest that multiple extraction steps are possible, if not desirable, and that the products from each of several extraction processes may be separately marketed. The first extraction will have a higher proportion of anthocyanin compared to subsequent extractions. The first extract may be marketed into one commercial field of use as the premium anthocyanin and the second and subsequent extracts may be marketed into other fields of use, where harmless impurities (such as starch) are not significant. If chemicals are added in the subsequent extraction processes or higher temperatures are applied to enhance the removal of the anthocyanins without damaging the kernels, the only adverse impact would likely be the removal of the potential Organic designation.

An important function of the pericarp/seed coat is the protection against moisture loss, moisture penetration and mold formation on the kernel from one planting season to the next. In addition it protects the starches, sugars, proteins and nutrients within the kernel from the effects of moisture. Therefore, after the extraction process and the re-drying of the kernel by-product that material is storage stable again. However, some storage care must be exercised and maintained to prevent exposure to moisture and other mold-enhancing or deteriorating conditions.

Corn kernels after harvest are normally provided with 2-5% kernel damage. Although this is within an acceptable range of damage in the present practice, it is desirable to increase the level of undamaged kernels in the technology to less than 1% to increase the purity of the extracts. This can be done by simple and conventional sizing and screening of kernels by use of a Fanning mill, for example.

The surprising aspect of this invention is the difference between the whole kernel and the prior art of crushed/broken kernel extraction processes. Extracts from crushed/broken kernel processes have more than 1% solids after filtration and a reduced relative proportion of anthocyanin per total solids as compared to the less than 1.0% filtrate solids of the whole kernel extraction processes. As a result of the whole kernel extraction process, the anthocyanin products are of higher purity and are more commercially viable products. Concentration, packaging and shipping costs are greatly reduced. In addition, the extracts of the broken/crushed kernel processes tend to precipitate upon cooling or concentrating because of the higher solids, and particularly because of the higher starch and other carbohydrates content.

Inventive Technology from Applicants on Varieties of Maize (Corn) that are Preferred in the Practice of the Invention and Disclosed in Copending Provisional Applications 60/945,430 Cited Above These varieties are provided by processes or methods of producing a maize plant by crossing a first parent maize plant with a second parent maize plant in which the first or second parent maize plant is the inbred maize line FAR601 or FAR045. Moreover, both the first and second parent maize plants may include the inbred maize lines FAR601 and FAR045.

This variety also includes manufacture by processes or methods of producing an FAR601 or FAR045-derived maize plant or an inbred maize plant with FAR601 or FAR045 as a parent in at least one of the initial breeding crosses accomplished by crossing inbred maize line FAR601 or FAR045 with a second maize plant and growing the progeny seed. The method may further include repeating crossing and growing the FAR601 or FAR045-derived plant until the substantial genotype of FAR601 or FAR045 is recovered. Thus, any methods using the inbred maize line FAR601 or FAR045 are contemplated to be within the scope of this invention, e.g., selfing, backcrossing, hybrid production, crosses to other hybrids, inbreds, populations, and the like. All plants produced using inbred maize line FAR601 or FAR045 as a parent (and any other designed or bred variety having the levels of anthocyanin described herein) are contemplated to be within and useful within the scope of this invention, including plants derived or further derived from inbred maize line FAR601 or FAR045. It should be further understood that inbred maize line FAR601 or FAR045 can, through routine manipulation known to skilled persons in the art, be produced in a male-sterile form and that such embodiments are contemplated to be within the scope of the present invention as well.

Tissue Culture of Maize—Background

Regeneration of maize plants by tissue culture methods is now an exercise requiring only routine experimentation to a person skilled in the art. For example, Duncan et al. (Planta 165:322-332 (1985)) reported 97% of the plant genotypes cultured produced calli capable of plant regeneration. Plants were regenerated from 91% of the calli from another set of inbreds and hybrids in a subsequent experiment.

Songstad et al., (Plant Cell Reports, 7:262-265 (1988)) reported several media additions enhancing regenerability of callus of two inbred lines. Other published reports also indicated "nontraditional" tissues capable of producing somatic embryogenesis and plant regeneration. For example, Rao, et al. (Maize Genetics Cooperation Newsletter, 60:64-65 (1986)) reported somatic embryogenesis from glume callus cultures. Conger, et al. (Plant Cell Reports, 6:345-347 (1987)) reported somatic embryogenesis from tissue cultures of maize leaf segments. Thus, it is clear that the state of the art is such that these tissue culture methods of obtaining regenerated plants are routinely used with very high rates of success.

Maize tissue culture is described generally in European Patent Application, Publication 160,390 and with respect to inbred line B73 in U.S. Pat. No. 5134,074 to Gordon et al. Maize tissue culture procedures are also described by U.S. Pat. No. 4,581,847 to Hibberd et al., by Kamo et al. "Establishment and Characterization of Long-Term Embryonic Maize Callus and Cell Suspension Cultures," Plant Science 45: 111-117, by Vasil et al., "Plant Regeneration from Friable Embryonic Callus and Cell Suspension Culture of *Zea mays* L.," J. Plant Physiol. 124:399-408 (1986), by Green et al., "Plant Regeneration in Tissue Culture of Maize," Maize for Biological Research (Plant Molecular Biology Association, Charlottesville, Va. 1982, at 367-372) and by Duncan, et al., "The Production of Callus Capable of Plant Regeneration from Immature Embryos of Numerous *Zea Mays* Genotypes," 165 Planta 322-332 (1985). Thus, another aspect of this invention is to provide cells, which undergo growth and differentiation and subsequently produce maize plants with the physiological and morphological characteristics of inbred maize line FAR601 or FAR045.

The utility of inbred maize line FAR601 or FAR045 (as described herein) also extends to crosses of those lines with other species. Suitable species will be of the family Gramineae, and especially genera such as *Zea, Tripsacum, Coix, Schlerachne, Polytoca, Chionachne*, and *Trilobachne*, of the tribe Maydeae. Potentially suitable for crosses with inbred maize/corn line FAR601 or FAR045 may be the various varieties of grain *sorghum, Sorghum bicolor* (L.) *Moench* and/or other species within the genus *Sorghum*.

Transformation

Molecular biological techniques now allow genes encoding specific protein products to be isolated and characterized. It has long been viewed as advantageous to modify maize plant genomes to contain and express foreign genes, or additional, or modified versions of native or endogenous genes (perhaps driven by different promoters) to alter traits of a plant in a specific, directed manner. Such foreign, additional and/or modified genes are referred to herein collectively as "transgenes" and several methods for producing transgenic plants have been developed. Accordingly, embodiments of this invention also include derived inbreds which are transformed versions of inbred maize line FAR601 or FAR045.

Plant transformation involves construction of an expression vector to function in plant cells. Such an expression vector includes DNA. The vector DNA, in turn, includes a gene under control of, or operatively linked to, a regulatory element such as a promoter. The expression vector may contain one or more such operably linked gene/regulatory element combinations; may be in the form of a plasmid; and can also be used alone, or in combination with other plasmids, to transform maize plants using transformation methods such as those described below.

Marker Genes

Expression vectors usually include at least one genetic marker operably linked to a regulatory element such as a promoter. The regulatory element allows transformed cells containing the marker to be recovered either by negative or positive selection. Negative selection includes inhibiting growth of cells not containing the selectable marker gene. By contrast, positive selection includes screening for the product encoded by the genetic marker. Many commonly used selectable markers for identifying transformed plant cells are known in the art. Such exemplary selectable markers include genes encoding enzymes which metabolically detoxify a selective chemical agent such as an antibiotic or an herbicide. Other selectable markers include genes encoding an altered target which is insensitive to an inhibitor. A few positive selection methods are also known.

One commonly used selectable marker is the neomycin phosphotransferase II gene (nptll), isolated from transposon Tn5 and conferring resistance to kanamycin. Fraleyet al., Proc. Natl. Acad. Sci. U.S.A, 80: 4803 (1983), U.S. Pat. No. 5,858,742 to Fraley et al. Another commonly used selectable marker gene is the hygromycin phosphotransferase gene conferring resistance to the antibiotic hygromycin. Vanden Elzen et al., Plant Mol. Biol., 5: 299 (1985).

Other selectable marker genes of bacterial origin conferring resistance to antibiotics include gentamycin acetyl transferase, streptomycin phosphotransferase, aminoglycoside-3'-adenyl transferase, and bleomycin resistance determinant. Hayford et al., Plant Physiol. 86: 1216 (1988); Jones et al., Mol. Gen. Genet., 210: 86 (1987); Svab et al., Plant Mol. Biol. 14: 197 (1990); and Hille et al., Plant Mol. Biol. 7: 171 (1986). Still other selectable markers confer resistance to herbicides such as glyphosate, glufosinate, or bromoxynil. Comai et al., Nature 317: 741-744 (1985); Gordon-Kamm et al., Plant Cell 2: 603-618 (1990); and Stalker et al., Science 242: 419-423 (1988). Yet other selectable marker genes include mouse dihydrofolate reductase, plant 5-enolpyruvylshikimate-3-phosphate synthase, and plant acetolactate synthase. Eichholtz et al, Somatic Cell Mol. Genet. 13: 67 (1987); Shah et al., Science 233: 478 (1986); and Charest et al., Plant Cell Rep. 8: 643 (1990).

Another class of marker genes useful in plant transformation requires screening putatively transformed plant cells, rather than direct genetic selection of transformed cells. These genes are used to quantify or visualize spatial patterns of gene expression in specific tissues. Marker genes of this nature are frequently termed "reporter genes" because they can be fused to a gene or gene regulatory sequence to investigate gene expression. Commonly used genes for screening presumptively transformed cells include fl-glucuronidase (GUS), /3-galactosidase, luciferase and chloramphenicol acetyltransferase. Jefferson, Plant Mol. Biol. Rep. 5: 387 (1987); Teeri et al., EMBO J. 8: 343 (1989); Koncz et al., Proc. Natl. Acad. Sci. U.S.A. 84: 131 (1987); and De Block et al., EMBO J. 3: 1681 (1984). Until recently, methods for visualizing GUS activity required destruction of the living plant material. However, in vivo methods for visualizing GUS activity not requiring destruction of plant tissue are now available. Molecular Probes Publication 2908, Imagene Green™, p. 1-4 (1993); and Naleway et al., J. Cell Biol. 115: 151a (1991).

Another method of identifying rare transformation events includes using a gene encoding a dominant constitutive regulator of the *Zea mays* anthocyanin pigmentation pathway. Ludwig et al., Science 247: 449 (1990). A gene encoding for Green Fluorescent Protein (GFP) has been utilized as a marker for gene expression in prokaryotic and eukaryotic cells. Chalfie et al., Science 263: 802 (1994).

Promoters

Genes in expression vectors must be driven by a nucleotide sequence comprising a regulatory element such as a promoter. Several types of promoters are now known, as are other regulatory elements which can be used singly or in combination with promoters. As used herein "promoter" includes a region of DNA upstream from the initial site of transcription. The promoter is involved in recognizing and binding RNA polymerase and other proteins during transcription initiation. A "plant promoter" is a promoter capable of initiating transcription in plant cells.

Examples of promoters under developmental control include promoters which preferentially initiate transcription in certain tissues, such as leaves, roots, seeds, fibers, xylem vessels, tracheids, or sclerenchyma. Such promoters are referred to as "tissue-preferred." Promoters initiating transcription only in certain tissues are referred to as "tissue-specific." A "cell type-specific" promoter primarily drives expression only in certain cell types present in specific organs, e.g., vascular cells in roots or leaves. An "inducible" promoter is a promoter under environmental control. Examples of environmental conditions affecting transcription by inducible promoters include anaerobic conditions or the presence of light. Tissue-specific, tissue-preferred, cell type-specific, and inducible promoters constitute the class of "non-constitutive" promoters. In contrast to non-constitutive promoters, "constitutive" promoters function under most environmental conditions.

A. Inducible Promoters

An inducible promoter may be operably linked to a gene to be expressed in maize. Optionally, the inducible promoter is operably linked to a nucleotide sequence encoding a signal sequence. The signal sequence, in turn, is operably linked to a gene to be expressed in maize. With an inducible promoter, the rate of transcription increases in response to an inducing agent. Any inducible promoter can be used in conjunction with this invention. See, e.g., Ward et al. Plant Mol. Biol. 22: 361-366 (1993). Exemplary inducible promoters include, but are not limited to, the promoter the ACEI system responding to copper (Melt et al. PNAS 90: 4567-4571 (1993)); the maize In2 gene responding to benzene sulfonamide herbicide safeners (Hershey et al., Mol. Gen. Genetics 227: 229-237 (1991) and Gatz et al., Mol. Gen. Genetics 243: 32-38 (1994)); or the Tet repressor from Tn10 (Gatz et al., Mol. Gen. Genet. 227: 229-237 (1991). One suitable inducible promoter responds to an inducing agent to which plants do not normally respond. One such exemplary inducible promoter is induced by a glucocorticosteroid hormone. Schena et al., Proc. Natl. Acad. Sci. U.S.A. 88: 0421 (1991).

B. Constitutive Promoters

A constitutive promoter is operably linked to a gene to be expressed in maize. Alternatively, the constitutive promoter is operably linked to a nucleotide sequence encoding a signal sequence which, in turn, is operably linked to a gene to be expressed in maize. Many different constitutive promoters can be utilized with respect to the inbred of this invention. Exemplary constitutive promoters include, but are not limited to, promoters from plant viruses such as the 35S promoter from CaMV (Odell et al., Nature 313: 810-812 (1985); U.S. Pat. No. 5,858,742 to Fraley et al.); promoters from such plant genes as rice actin (McElroy et al., Plant Cell 2: 163-171 (1990)); ubiquitin (Christensen et al., Plant Mol. Biol 12: 619-632 (1989) and Christensen et al., Plant Mol. Biol. 18: 675-689 (1992)); pEMU (Last et al., Theor. Appl. Genet. 81: 581-588 (1991)); MAS (Velten et al., EMBO J. 3: 2723-2730 (1984)) and maize H3 histone (Lepetit et al., Mol. Gen. Genet. 231: 276-285 (1992) and Atanassova et al., Plant Journal 2(3): 291-300 (1992)); and the ALS promoter, a XbaI/NcoI fragment 5' to the Brassica napus ALS3 structural gene or a nucleotide sequence with substantial sequence similarity (PCT Application No. WO96/30530).

C. Tissue-Specific or Tissue-Preferred Promoters

A tissue-specific promoter is operably linked to a gene to be expressed in maize. Optionally, the tissue-specific promoter is operably linked to a nucleotide sequence encoding a signal sequence which is operably linked to a gene to be expressed in maize. Plants transformed with a gene operably linked to a tissue-specific promoter produce the protein product of the transgene exclusively, or preferentially, in a specific tissue.

Any tissue-specific or tissue-preferred promoter can be introgressed into the inbred of this invention. Exemplary tissue-specific or tissue-preferred promoters include, but are not limited to, a root-preferred promoter, such as that from the phaseolin gene (Murai et al., Science 23: 476-482 (1983) and Sengupta-Gopalan et al., Proc. Natl. Acad. Sci. USA 82: 3320-3324 (1985)); a leaf-specific and light-induced promoter such as that from cab or rubisco (Simpson et al., EMBO J. 4(11): 2723-2729 (1985) and Timko et al., Nature 318: 579-582 (1985)); an anther-specific promoter such as that from LAT52 (Twell et al., Mol. Gen. Genet. 217: 240-245 (1989)); a pollen-specific promoter such as that from Zm13 (Guerrero et al., Mol. Gen. Genet. 224: 161-168 (1993)); and a microspore-preferred promoter such as that from apg (Twell et al., Sex. Plant Reprod. 6:217-224 (1993)).

Signal sequences for targeting proteins to subcellular compartments proteins produced by transgenes may be transported to a subcellular location such as a chloroplast, vacuole, peroxisome, glyoxysome, cell wall or mitochondrion, or for secretion into the apoplast, by operably linking the nucleotide sequence encoding a signal sequence to the 5' and/or 3' region of a gene encoding the protein of interest. Targeting sequences at the 5' and/or 3' end of the structural gene may determine where the encoded protein is ultimately compartmentalized during protein synthesis and processing. The presence of a signal sequence directs a polypeptide to an intracellular organelle, a subcellular compartment, or to the apoplast for secretion. Many signal sequences are known in the art. See, e.g., Becker et al., Plant Mol. Biol. 20: 49 (1992); P.S. Close, Master's Thesis, Iowa State University (1993); Knox, et al., "Structure and Organization of Two Divergent Alpha-Amylase Genes From Barley," Plant Mol. Biol. 9: 3-17 (1987); Lerner et al., Plant Physiol. 91: 124-129 (1989); Fontes et al., Plant Cell 3:483-496 (1991); Matsuoka et al., Proc. Natl. Acad. Sci. 88: 834 (1991); Gould et al., J. Cell Biol 108: 1657 (1989); Creissen et al., Plant J. 2: 129 (1991); Kalderon et al., "A short amino acid sequence able to specify nuclear location", Cell 39: 499-509 (1984); and Stiefel et al., "Expression of a maize cell wall hydroxyproline-rich glycoprotein gene in early leaf and root vascular differentiation," Plant Cell 2: 785-793 (1990).

Foreign Protein Genes and Agronomic Genes

A foreign protein can be produced by transgenic plants of this invention and may further be produced in commercial quantities. Thus, techniques for selection and propagation of transformed plants understood in the art provide a plurality of transgenic plants, which may be harvested in a conventional manner. A foreign protein expressed in the transgenic plants can then be extracted either from a specific tissue or from total harvested plant biomass. Protein extraction from plant biomass can be accomplished by methods which are discussed, e.g., by Heney et al., Anal. Biochem. 114: 92-96 (1981).

Thus, these preferred lines described in the practice of this invention are contemplated to include transformed, therefore derived, embodiments of inbred maize line FAR601 or FAR045. In another embodiment, the biomass of interest is the vegetative tissue of inbred maize line FAR601 or FAR045. In yet another embodiment, the biomass of interest is seed. For transgenic plants, a genetic map can be generated, primarily via conventional Restriction Fragment Length Polymorphisms (RFLP), Polymerase Chain Reaction (PCR) analysis, and Simple Sequence Repeats. (SSR), which identify the approximate chromosomal location of the integrated DNA. For exemplary methodologies in this regard, see Glick et al., Methods in Plant Molecular Biology and Biotechnology, 269-284 (CRC Press, Boca Raton, 1993). Map information concerning chromosomal location is useful for proprietary protection of a given transgenic plant. Hence, if unauthorized propagation occurs and crosses of the present inbred are made to other germplasm, the map of the integration region can be compared to similar maps of suspect plants, thereby determining whether the suspect plants have a common parentage with the subject plant. Map comparisons require hybridization and subsequent RFLP, PCR, SSR and/or sequencing, all known techniques.

Agronomic genes can be expressed in the transformed plants of this invention. More particularly, plants of this invention can be transformed, or otherwise derived, to express various phenotypes of agronomic interest. Exemplary genes implicated in this regard include, but are not limited to, those categorized below.

Genes Conferring Resistance To Pests or Diseases (A) Plant disease resistance genes. Plant defenses are often activated by specific interaction between the product of a disease resistance gene (R) in the plant and the product of a corresponding avirulence (Avr) gene in the pathogen. A plant variety can be transformed with a cloned disease resistance gene to develop plants resistant to pathogen strains. See, e.g., Jones et al., Science 266: 789 (1994) (cloning of tomato Cf-9 gene resistant to *Cladosporium fulvum*); Martin et al., Science 262: 1432 (1993) (tomato Pto gene resistant to *Pseudomonas syringae* pv. tomato encoding a protein kinase); Mindrinos et al., Cell 78:1089 (1994) (*Arabidopsis* RSP2 gene resistant to *Pseudomonas syringae*); U.S. Pat. No. 5,789,214 to Ryals et al. (chemically regulatable DNA sequences regulating transcription of pathogenesis-related proteins); and PCT Patent Application Publication WO95/16776 to Putman et al. (derivatives of tachyplesin peptide with antimicrobial activity against plant pathogens).

(B) *Bacillus thuringiensis* (B.t.) proteins, derivatives thereof, or a synthetic polypeptides modeled thereon. See, e.g., Geiser et al., Gene 48: 109 (1986) (cloning and nucleotide sequencing of Bt S-endotoxin gene). DNA molecules encoding S-endotoxin genes are designated as ATCC Accession Nos. 40098, 67136, 31995 and 31998 and can be obtained from American Type Culture Collection, Manassas, Va. 20110.

(C) Lectins. See, e.g., Van Damme et al., Plant Molec. Biol. 24: 25 (1994) (nucleotide sequences of Clivia miniata mannose-binding lectin genes).

(D) Vitamin-binding proteins such as avidin. See, e.g., PCT Application No. US93/06487 (avidin and avidin homologues as larvicides against insect pests).

(E) Enzyme inhibitors such as protease inhibitors or amylase inhibitors. See, e.g., Abe et al., J. Biol. Chem. 262: 16793 (1987) (nucleotide sequence of rice cysteine proteinase inhibitor); Huub et al., Plant Molec. Biol. 21: 985 (1993) (nucleotide sequence of cDNA encoding tobacco proteinase inhibitor I); and Sumitani et al., Biosci. Biotech. Biochem. 57: 1243 (1993) (nucleotide sequence of *Streptomyces nitrosporeus* a-amylase inhibitor).

(F) An insect-specific hormone or pheromone such as an ecdysteroid and juvenile hormone, a variant thereof, a mimetic based thereon, or an antagonist or agonist thereof. See, e.g., Hammock et al., Nature 344: 458 (1990), (baculovirus expression of cloned juvenile hormone esterase, an inactivator of juvenile hormone).

(G) Insect-specific peptides or neuropeptides disrupting pest physiologies. See, e.g., Regan, Biol. Chem. 269: 9 (1994) (expression cloning yields DNA coding for insect diuretic hormone receptor); and Pratt et al., Biochem. Biophys. Res. Comm. 163: 1243 (1989) (allostatin identified in *Diploptera puntata*); U.S. Pat. No. 5,266,317 to Tomalski et al. (genes encoding insect-specific, paralytic neurotoxins).

(H) Insect-specific venoms produced in nature by, e.g., snakes, wasps. See, e.g., Pang et al., Gene 116: 165 (1992) (heterologous expression in plants of a gene coding a scorpion insectotoxic peptide).

(I) Enzymes responsible for hyperaccumulation of monterpenes, a sesquiterpenes, steroids, hydroxamic acids, phenylpropanoid derivatives or other non-protein molecules with insecticidal activity.

(J) Enzymes involved in the modification, including post-translational modification, of biologically active molecules. Such enzymes are contemplated to include natural or synthetic glycolytic enzymes, proteolytic enzymes, lipolytic enzymes, nucleases, cyclases, transaminases, esterases, hydrolases, phosphatases, kinases, phosphorylases, polymerases, elastases, chitinases and glucanases. See, e.g., PCT Application No. WO 93/02197 to Scott et al. (callase gene nucleotide sequence). DNA molecules containing chitinase-encoding sequences can be obtained, e.g., from the ATCC under Accession Nos. 39637 and 67152. See, also Kramer et al., Insect Biochem. Molec. 30 Biol. 23: 691 (1993) (nucleotide sequence of cDNA-encoding tobacco hookworm chitinase); and Kawalleck et al., Plant Molec. Biol. 21: 673 (1993) (nucleotide sequence of the parsley ubi4-2 polyubiquitin gene).

(K) Molecules stimulating signal transduction. See, e.g., Botella et al., Plant Molec. Biol. 24: 757 (1994) (nucleotide sequences for mung bean calmodulin cDNA clones); and Griess et al., Plant Physiol. 104: 1467 (1994) (nucleotide sequence of maize calmodulin cDNA clone).

(L) Hydrophobic moment peptides. See, e.g., PCT Application No. WO95/16776 (peptide derivatives of Tachyplesin-inhibiting fungal plant pathogens) and PCT Application No. WO95/18855 (synthetic antimicrobial peptides conferring disease resistance).

(M) Membrane permeases, channel formers, or channel blockers. See, e.g., Jaynes et al., Plant Sci. 89: 43 (1993) (heterologous expression of cecropin-f3 lytic peptide analog rendering transgenic tobacco plants resistant to *Pseudomonas solanacearum*).

(N) Viral-invasive proteins or complex toxins derived therefrom. For example, the accumulation of viral coat proteins in transformed plant cells imparting resistance to viral infection and/or disease development effected by the virus from which the coat protein gene is derived, as well as to related viruses. See, e.g., Beachy et al., Ann. Rev. Phytopathol. 28: 451 (1990). Coat protein-mediated resistance has been conferred on transformed plants against alfalfa mosaic virus, cucumber mosaic virus, tobacco streak virus, potato virus X, potato virus Y, tobacco etch virus, tobacco rattle virus and tobacco mosaic virus.

(O) Insect-specific antibodies or immunotoxins derived therefrom. An antibody targeted to a critical metabolic function in the insect gut inactivating an affected enzyme, thereby killing the insect. Cf. Taylor et al., Abstract #497, SEVENTH INT'L SYMPOSIUM ON MOLECULAR PLANT-MICROBE INTERACTIONS (Edinburgh, Scotland, 1994) (enzymatic inactivation in transgenic tobacco via single-chain antibody fragment production).

(P) Virus-specific antibodies. See, e.g., Tavladoraki et al., Nature 366: 469 (1993), (transgenic plants expressing recombinant antibody genes are protected from virus attack).

(Q) Developmental-arrestive proteins produced by pathogens or parasites. See, e.g., Lamb et al., Bio/Technology 10: 1436 (1992) (fungal endo a-1,4-D-polygalacturonases facilitating fungal colonization and plant nutrient release by solubilizing plant cell wall homo-a-1,4-D-galacturonase); and Toubart et al., Plant J. 2: 367 (1992) (cloning and characterization of a gene encoding bean endopolygalacturonase-inhibiting protein).

(R) Developmental-arrestive proteins produced by plants. See, e.g., Logemann et al., Bio/Technology 10: 305 (1992) (increased resistance to fungal disease in transgenic plants expressing barley ribosome-inactivating gene).

Genes Conferring Resistance To Herbicides (A) Herbicides inhibiting growing points or meristems, such as imidazolinone or a sulfonylurea. Exemplary genes in this category encode mutant ALS and AHAS enzymes, respectively described by Lee et al., EMBO J. 7: 1241 (1988); and Miki et al., Theor. Appl. Genet. 80: 449 (1990).

(B) Glyphosate resistance (imparted by mutant 5-enolpyruvl-3-phosphoshikimate synthase (EPSP) and aroA genes, respectively) and other phosphono compounds such as glufosinate (phosphinothricin acetyl transferase (PAT) and *Streptomyces hygroscopicus* phosphinothricin acetyl transferase (bar) genes), and pyridinoxy or phenoxy proprionic acids and cyclohexones (ACCase inhibitor-encoding genes). See, e.g., U.S. Pat. No. 4,940,835 to Shah et al., (EPSP clone conferring glyphosate resistance). A DNA molecule encoding a mutant aroA gene can be obtained under ATCC Accession No. 39256. The nucleotide sequence of such a mutant gene is disclosed in U.S. Pat. No. 4,769,061 to Comai. European Patent Application No. 0 333 033 to Kumada et al. and U.S. Pat. No. 4,975,374 to Goodman et al. disclose nucleotide sequences of glutamine synthetase genes conferring resistance to herbicides such as L-phosphinothricin. A nucleotide sequence of a phosphinothricin-acetyl-transferase gene is disclosed in European Patent Application 0 242 246 to Leemans et al. De Greef et al., Bio/Technology 7: 61 (1989), describe the production of transgenic plants expressing chimeric bar genes coding for phosphinothricin acetyl transferase activity. Exemplary genes conferring resistance to phenoxy proprionic acids and cyclohexones, such as sethoxydim and haloxyfop, are the Accl-S 1, Accl-S2 and Accl-S3 genes described by Marshall et al., Theor. Appl. Genet. 83: 435 (1992).

(C) Photosynthesis-inhibiting herbicides, such as triazines (psbA and gs+genes) and benzonitriles (nitrilase gene). Przibilla et al., Plant Cell 3: 169 (1991) (transformation of *Chlamydomonas* using plasmids encoding mutant psbA genes); U.S. Pat. No. 4,810,648 to Stalker (nucleotide sequences for nitrilase genes, available under ATCC Accession Nos. 53435, 67441 and 67442); Hayes et al., Biochem. J. 285:173 (1992) (cloning and expression of DNA coding for glutathione S-transferase).

Genes Conferring, Or Contributing To, Value-Added Traits in Maize (A) Modified fatty acid metabolism, for example transforming a plant with an antisense gene of stearoyl-ACP desaturase to increase stearic acid content. See, e.g., Knultzon et al., Proc. Natl. Acad. Sci. USA 89: 2624 (1992).

(B) Decreased Phytate Content
(1) Phytase-encoding genes enhancing breakdown of phytate by adding free phosphate to the transformed plant. See, e.g., Van Hartingsveldt et al., Gene 127: 87 (1993) (nucleotide sequence of an *Aspergillus niger* phytase gene).
(2) Genes reducing phytate content. For example, cloning, then reintroducing DNA associated with the allele responsible for maize mutants characterized by low levels of phytic acid. See, e.g., Raboy et al., Maydica 35: 383 (1990).

(C) Modified carbohydrate compositions. For example, transforming plants with a gene encoding an enzyme altering starch branching patterns. See, e.g., Shiroza et al., J. Bacteriol. 170: 810 (1988) (nucleotide sequence of *Streptococcus mutans* fructosyltransferase gene); Steinmetz et al., Mol. Gen. Genet. 200: 220 (1985) (nucleotide sequence of *Bacillus subtilis* levansucrase gene); Pen et al., Bio/Technology 10: 292 (1992) (production of transgenic plants expressing *Bacillus licheniformis* a-amylase); Elliot et al., Plant Molec. Biol. 21: 515 (1993) (nucleotide sequences of tomato invertase genes); Sogaard et al., J. Biol. Chem. 268: 22480 (1993) (site-directed mutagenesis of barley a-amylase gene); and Fisher et al., Plant Physiol. 102: 1045 (1993) (maize/corn endosperm starch branching enzyme II).

Maize Transformation Methods

Plant transformation methods contemplated to transform the inbred of this invention include biological and physical plant transformation protocols. See, e.g., Miki et al., "Procedures for Introducing Foreign DNA into Plants" IN Methods in Plant Molecular Biology and Biotechnology, B. R. Glick and J. E. Thompson, Eds. (CRC Press, Inc., Boca Raton, 1993) pages 67-88; Gruber et al., "Vectors for Plant Transformation" in Methods in Plant Molecular Biology and Biotechnology (expression vectors and in vitro culture methods for plant cell or tissue transformation and regeneration of plants); and B. R. Glick and J. E. Thompson, Eds., CRC Press, Inc., Boca Raton, (1993) pages 89-119 (expression vectors and in vitro culture methods for plant cell or tissue transformation and regeneration of plants).

A. *Agrobacterium*-Mediated Transformation

One method for introducing an expression vector into plants is based on the natural transformation system of *Agrobacterium*. See, e.g., Horsch et al., Science 227: 1229 (1985). *A. tumefaciens* and *A. rhizogenes* are plant pathogenic soil bacteria which infect, and genetically transform, plant cells during infection. The Ti and Ri plasmids of *A. tumefaciens* and *A. rhizogenes*, respectively, carry genes responsible for genetic transformation of the plant. See, e.g., Kado, Crit. Rev. Plant. Sci.10: 1 (1991). Descriptions of *Agrobacterium* vector systems and methods for *Agrobacterium*-mediated gene transfer (transformation) are provided by Gruber et al., "Vectors for Plant Transformation" IN Methods in Plant Molecular Biology and Biotechnology; Miki et al., "Procedures for Introducing Foreign DNA into Plants" IN Methods in Plant Molecular Biology and Biotechnology, B. R. Glick and J. E. Thompson, Eds. (CRC Press, Inc., Boca Raton, 1993) pages 67-88; Moloney et al., Plant Cell Reports 8: 238 (1989); and U.S. Pat. No. 5,591,616 to Hiei et al.; and U.S. Pat. No. 6,822,144, issued 23 Nov. 2004 to Zhao et al.

B. Direct Gene Transfer

Despite the fact that the host range for *Agrobacterium*-mediated transformation is broad and with some exceptions in rice and maize, most major cereal crop species and gymnosperms have generally been recalcitrant to this mode of gene transfer. Hiei et al., The Plant Journal 6: 271-282 (1994); and U.S. Pat. No. 5,591,616 to Hiei et al. Several methods of plant transformation, collectively referred to as direct gene transfer, have been developed as alternatives to *Agrobacterium*-mediated transformation.

One generally applicable method of plant transformation is microprojectile-mediated transformation, wherein an expression vector is applied to the surfaces of 1 to 4 µm diameter microprojectiles. The expression vector is then introduced into plant tissues with a biolistic device which accelerates the microprojectiles to velocities sufficient to penetrate plant cell walls and membranes of the tissues, e.g., 300 to 600 m/s. Sanford et al., Part. Sci. Technol. 5: 27 (1987); Sanford, Trends Biotech. 6: 299 (1988); Klein et al., Bio/Technology 6: 559-563 (1988); Sanford, Physiol Plant 79: 206 (1990); Klein et al., Biotechnology 10: 268 (1992); U.S. Pat. No. 5,550,318 to Adams et al.; U.S. Pat. No. 5,877,023 to Sautter et al; and U.S. Pat. Nos. 5,886,244 and 5,990,387 to Tomes et al. In maize, several target tissues can be bombarded with DNA-coated microprojectiles to produce transgenic, hence derived, plants, including, for example, callus (Type I or Type II), immature embryos, and meristematic tissue. Another method for physical delivery of DNA to plants is sonication of target cells. Zhang et al., Bio/Technology 9: 996 (1991). Alternatively, liposome or spheroplast fusion may be used to introduce expression vectors into plants. Deshayes et al., EMBO J., 4: 2731 (1985); Christou et al., Proc Natl. Acad. Sci. U.S.A. 84: 3962 (1987). Direct uptake of DNA into protoplasts using CaCl2 precipitation, polyvinyl alcohol or poly-L-ornithine has also been reported. Hain et al., Mol. Gen. Genet. 199: 161 (1985) and Draper et al., Plant Cell Physiol. 23: 451 (1982). Electroporation of protoplasts and whole cells and tissues has also been described. Donn et al., In Abstracts of VIIth International Congress on Plant Cell and Tissue Culture IAPTC, A2-38, p 53 (1990); D'Halluin et al., Plant Cell 4: 1495-1505 (1992); Spencer et al., Plant Mol. Biol. 24: 51-61(1994); and U.S. Pat. No. 5,384,253 to Krzyzek et al., previously referenced.

Following transformation of maize target tissues, expression of the above-described selectable marker genes allows for preferential selection of transformed cells, tissues and/or plants, using regeneration and selection methods known to the art.

The foregoing transformation methods may be used to produce transgenic derived inbred lines of this invention. These transgenic inbred lines may then be crossed with another (non-transformed or transformed) inbred line to produce a transgenic hybrid maize plant. Alternatively, a genetic trait introgressed into a maize line using the foregoing transformation protocols may be transferred to another line using traditional backcrossing techniques known to the plant breeding arts, e.g., backcrossing an engineered trait from a public, non-elite line into an elite line, or from a hybrid maize plant with a foreign transformed gene into an inbred line not containing that gene. As used herein, "crossing" can refer to a single cross or to the process of backcrossing.

Industrial Applicability

Maize/corn is used as human food, livestock feed, as raw materials in industry, and as a source of pigments. The food uses of maize/corn, in addition to human consumption of maize/corn kernels in various forms, include products of the dry-milling and wet-milling industries, as well as pigments for colorant. The principal products of maize/corn dry milling are grits, meal and flour. The maize/corn wet-milling industry provides maize/corn starch, maize/corn syrup, and dextrose for food use. Maize/corn oil is recovered from maize/corn germ, which is a by-product of both the dry-milling and wet-milling industries.

Maize/corn, including both kernel and non-kernel portions of the plant, is also used extensively as livestock feed, primarily for beef cattle, dairy cattle, swine, and poultry. As will be shown, the kernel and non-kernel portions of the preferred inbreds of this invention can be used as pigment sources. These pigments can be used with regulatory limitations in foods, beverages, cosmetics and other applications. Industrial uses of maize/corn and in the case of the present technology, corn by-product, include production of ethanol, maize/corn starch in the wet-milling industry and maize/corn flour in the dry-milling industry. The industrial applications of maize/corn starch and flour are based on functional properties, such as viscosity, film formation, adhesive properties, and abilities to suspend particles. Maize/corn starch and flour have applications in paper and textile industries. Other industrial uses include adhesives, building materials, foundry binders, laundry starches, explosives, oil-well mud, and mining applications. An example of such application is the use of the corn by-product of the present technology in the manufacturing of extruded products (i.e., breakfast cereals, snacks, etc). These properties and the appearance of the corn for consumption are not altered by the extraction described herein, except where the pigment/dye is an essential component of the required use.

Plant parts other than the seed of maize/corn are also used in industry. For example, stalks and husks are made into paper and wallboard and cobs are used for fuel and in making charcoal. Hence, the seed of inbred maize line FAR601 or FAR045, the plant produced from the inbred seed, the hybrid maize/corn plant produced from the crossing of the inbred, hybrid seed, and various parts of the hybrid maize/corn plant and transgenic versions of the foregoing, can be utilized for human food, livestock feed, as a raw material in industry or as a source of extracted pigments.

As previously indicated, the present invention relates to inbred lines of corn, including importantly plant parts and tissue of these inbred lines of corn, seed for such inbred lines, the use of the inbreds to produce hybrid corn plants, hybrid corn plants obtained using at least one of the inbreds as a parent and parts and tissue of these hybrid corn plants.

As used herein, the term "inbred line" or "inbred lines" means a group of plants from a common ancestry which are essentially homozygous and which are true breeding (i.e., uniform and stable with respect to all of their agronomically important characteristics). In preferred embodiments, the inbred lines have the characteristics of the lines designated as FAR601 or FAR045. Generally, the preferred seeds of inbred corn lines, in accordance with the invention, have the characteristics of the seeds of each of the designated lines.

Anthocyanins are plant-based polyphenolic pigments belonging to the class of molecules termed flavonoids. Consequently, anthocyanins are a very diverse group of compounds with a basic structure: anthocyanidin glycosidically linked to carbohydrate moieties and/or acyl groups. Anthocyanins commonly found in red or purple corn may include Cyanidin 3-glucoside, Cyanidin 3-(6"-malonylglucoside), Cyanidin 3-(malonyl) glucoside, Cyanidin 3-(dimalonyl) glucoside, Cyanidin 3-(malonyl)(succinyl) glucoside, (and other derivatives); Pelargonidin 3-glucoside, Pelargonidin 3-(malonyl) glucoside, Pelargonidin 3-(dimalonyl) glucoside (and other derivatives); Peonidin 3-glucoside, Peonidin 3-(malonyl) glucoside, Peonidin 3-(dimalonyl) glucoside, Peonidin 3-(succinyl) glucoside (and other derivatives); Cyanidin 3-(6"-malonyl) galactoside' Cyanidin 3-(dimalonyl) galactoside (and derivatives); Peonidin 3-(malonyl) galactoside, Petunidin 3-glucoside; Cyanidin 3-(malonyl)(succinyl) galactoside, (and derivatives); free and acylated. Anthocyanins are widely found in flowering plants, such as corn. These compounds are typically water soluble, non-toxic compounds displaying a range of colors from orange, bright red/purple to blue. Anthocyanins are polar molecules and, therefore, are more soluble in polar solvents. Solubility also depends on various conditions such as pH, temperature, type of solvent, concentration, etc. Extractions may use solvents such as water, methanol, ethanol, or mixtures thereof, optionally acidified (e.g., between about 0.001% and 0.01% HCl).

Other useful compounds may be present in extracts from the inbreds of this invention and their hybrid, such as flavonoids, phenolic acids, and carbohydrates. Suitable flavonoids include (−)-Epicatechin, (−)-Epicatechin 3-gallate, (−)-Epigallocatechin, (−)-Epigallocatechin 3-gallate, (+)-Catechin, (+)-Gallocatechin. Suitable phenolic acids include Ferulic acid and derivatives, Quercetin and derivatives, P-coumaric acid and derivatives, Protocatechuic acid and derivatives, Vanillic acid and derivatives, Hesperitin and derivatives, Hydroxycinnamic acid and derivatives, Gallic acid and derivatives. A non-limiting recital of carbohydrates would include common sugars such as arabinose, rhamnose or galactose and/or with acylating acids.

Each of the inbred corn lines FAR601 and FAR045, as indicated, are substantially homozygous and can be reproduced by planting seed of the line, growing the resulting corn plants under self-pollinating or sibbing with adequate isolation, and harvesting the resulting seed using techniques familiar to those of skill in the art. A hybrid of FAR601 and FAR045 can be produced by growing the two inbreds in proximity, then detasseling one of the inbreds in this invention. Alternately, other methods of pollen control as more fully described herein can be used as well.

Each of the inbreds and their hybrid has shown uniformity and stability within the limits of environmental influence for each of the traits described in Table I. As also indicated below, each inbred has been self-pollinated a sufficient number of generations with careful attention paid to uniformity of plant type to ensure homozygosity and phenotypic stability.

Products according to the present technology include, but are not limited to, concentrated extraction products from corn kernels comprising an aqueous composition having at least 1%, at least 5%, at least 25% and more (up to a dry product of less than 10% water and approaching or at 0% water as a powder or particle) by weight of an anthocyanin content. The anthocyanin content characterized as having less than 65% by weight of non-acylated anthocyanin and at least 35% by weight of acylated anthocyanin and at least 11 chromatographic peaks representing distinct anthocyanin compounds (Brunswick Laboratories, Table 1A). These extraction products may satisfy the legal standards of certified organic according to 7 C.F.R. Part 205; Federal Register, Vol. 65, No. 246, 21 Dec. 2000. The concentrated extraction products may have at least 1% by weight of an anthocyanin content, the anthocyanin content characterized as having less than 50% by weight of non-acylated anthocyanin and at least 50% by weight of acylated anthocyanin and at least 14 chromatographic peaks representing distinct anthocyanin compounds (Brunswick Laboratories, Table iA), and may have at least 13% by total weight of anthocyanin of cyanidin 3-glucoside and at least 30% by total weight of anthocyanin of cyanidin 3-(6"-malonoyl) glucoside. The anthocyanin content may comprise at least 5% by total weight of anthocyanin of cyanidin 3-(malonoyl)(malonoyl) glucoside.

A packaged food product may contain at least 0.1% by weight of the extraction products in a package with edible ingredients. These food products may meet the legal standards of 7 C.F.R. Part 205; Federal Register, Vol. 65, No. 246, 21 Dec. 2000 for labeling as organic.

The extraction product may contain a distribution of anthocyanin comprising:

TABLE IA

| | | |
|---|---|---|
| cyanidin 3-glucoside | 11-16% | 18-32% |
| cyanidin 3-(6"-malonoyl) galactoside | 5-10% | 3-8% |
| peonidin 3-glucoside | 1-5% | 1-6% |
| cyanidin 3-(6"-malonoyl) glucoside | 30-45% | 30-52% |
| cyanidin 3-(malonoyl)(malonoyl) galactoside | 3-6% | 1-5% |
| pelargonidin 3-(malonoyl) glucoside | 2-6% | 0.8-4% |
| cyanidin 3-(malonoyl)(malonoyl) glucoside | 8-16% | 4-10% |
| peonidin 3-(malonoyl) galactoside | 3-8% | 2-8% |
| peonidin 3-(malonoyl) glucoside | 1-6% | 1-6% |
| pelargonidin 3-(malonoyl)(malonoyl) glucoside | 1-4% | 0.2-2% |
| cyanidin 3-(malonoyl)(succinyl) galactoside | 1-4% | 0.2-2% |
| peonidin 3-(malonoyl)(malonoyl) glucoside | 1-4% | 0.2-2% |
| cyanidin 3-(malonoyl)(succinyl) glucoside | 0.5-3% | 0.2-2% |
| peonidin 3-(succinoyl) glucoside | 0.1-2.5% | 0.1-1.5% |

The data of Table I represent 34 morphological traits associated with the Table of Characteristics published by the International Union for the Protection of New Varieties of Plants (UPOV). The gathering of data associated with the characteristics was done in accordance with the guidelines for conductive tests for distinctiveness, uniformity and stability also published by UPOV and well known to those skilled in the art. A more detailed description of these traits can be found in Guidelines for the Conduct of Tests for Distinctness, Uniformity and Stability, TG/2/6, UPOV (1999), hereby incorporated by reference.

As can be seen in the data of Table I, each of the inbred varieties exhibits characteristic unusual strong red coloration in plant parts and tissue, including stems, leaves, glumes of cob and base of brace roots.

Table II shows the history of development for each of the inbred lines, each of which represents at least six to seven inbred generations.

One aspect of the invention provides novel corn inbreds FAR601 and FAR045 as red-pigmented corn inbreds with superior characteristics providing excellent male and/or female parental lines for producing F1 corn hybrids also having excellent characteristics. It will be appreciated that the invention is intended to cover both inbred and hybrid plants and parts (tissues or cells) thereof. This includes any plant parts and tissues acceptable for use in extracting pigments present therein as well as for other uses described herein.

As seen in Table II, line FAR601 was derived from Rhine Valley spontaneous red corn segregate commonly available in Germany and was inbred using pedigree breeding for seven generations. Inbred FAR601 is uniform and stable and appears to be homozygous for all characteristics.

Line FAR045 was derived from a cross of a spontaneous red corn into elite germplasm, then developed by self-pollination of successive inbred generations, accompanied by selection in a pedigree breeding program over eight generations. Line FAR045 has been observed to uniform and stable and appears to be homozygous for all agronomic characteristics.

WORKING EXAMPLE 1

One acre of the hybrid of FAR045*FAR601 was grown near Lamberton, Minn. in 2006. The seed/kernel yield, adjusted to 15.5% moisture at harvest and expressed at 56 pounds per bushel, was 120 bushels per acre.

WORKING EXAMPLE 2

Referring to Table III, the hybrid of FAR045*FAR601 was grown in 2005 and 2006. Tissues from representative plants were sampled to determine anthocyanin concentrations extracted from each tissue. The plants were harvested near the black layer stage of maturity (late silage stage) on Sep. 30 in 2005 and Oct. 1 in 2006. In each year, samples from the tissues termed seed/kernel, husks, cobs, leaves, and stalks were taken, chopped by hand and air dried at about 50□C. The samples were then ground in a Waring Blender followed by a Retsch Mill. The ground samples were subsequently immersed in an extraction solution or solvent (50:50 water:alcohol (although not preferred), by volume having 0.1M HCl and stirred or agitated at about 37□C. After about 1.5 hours of agitation in the extraction solution, the resulting slurry was filtered through a nylon mesh screen, then through a #4 Whatman filter paper and assayed for proportion of anthocyanins present. In 2006 a greater amount and percentage of pigment was present. However, in both years most of the anthocyanin extracted was from the husk, followed by that from the seed/kernel. Other significant amounts of anthocyanin were obtained from the cob and stalk tissues and very little from the leaves. By way of illustration, and not limitation, a cup (approximately 164 grams) of corn would be expected to have the following nutritional characteristics of Table IV.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

TABLE I

MORPHOLOGICAL DESCRIPTION OF INBREDS FAR601 AND FAR045 AND THEIR F1 HYBRID

| UPOV | Characteristic | FAR601 | FAR045 | Female Male F1 Hybrid FAR045*044)(FAR601 |
|---|---|---|---|---|
| 1. | first leaf: anthocyanin coloration of sheet | 9 | 9 | 9 |
| 2. | first leaf: shape of tip | 5 | 4 | 4 |
| 3. | leaf: angle between blade and stem | 5 | 2 | 3 |
| 4. | attitude of blade | 5 | 3 | 4 |
| 5. | degree of zig-zag | 1 | 1 | 1 |
| 6. | stem: anthocyanin coloration at base of brace roots | 9 | 9 | 9 |
| 7. | time of anthesis | 4 | 4 | 4 |
| 8. | tassel: anthocyanin coloration at base of glume | 8 | 9 | 9 |
| 9. | tassel: anthocyanin coloration of glumes | 8 | 5 | 7 |
| 10. | tassel: anthocyanin coloration of anthers | 6 | 1 | 4 |
| 11. | tassel: density of spikelets | 3 | 3 | 3 |
| 12. | tassel: angle between main axis and lateral branches | 7 | 5 | 5 |
| 13. | tassel: attitude of lateral branches | 3 | 5 | 5 |
| 14. | tassel: number of lateral branches | 3 | 3 | 3 |
| 15. | ear: time of silk emergence | 4 | 4 | 4 |
| 16. | ear: anthocyanin coloration of silks | 8 | 3 | 9 |
| 17. | ear: intensity of anthocyanin coloration of silks | 4 | 1 | 3 |
| 18. | leaf: anthocyanin coloration of sheat | 9 | 1 | 9 |
| 19. | tassel: length of main axis above lowest side branches | 6 | 6 | 6 |
| 20. | tassel: length of main axis above highest side branches | 6 | 6 | 6 |
| 21. | tassel: length of side branches | 5 | 5 | 5 |
| 22. | plant: length | 6 | 6 | 7 |
| 23. | ear: height of insertion, relative to plant height | 5 | 4 | 5 |
| 24. | leaf: width of blade | 4 | 5 | 5 |
| 25. | ear: length of peduncle | 3 | 2 | 2 |
| 26. | ear: length | 4 | 5 | 6 |
| 27. | ear: diameter of ear | 4 | 4 | 5 |
| 28. | ear: shape | 2 | 2 | 2 |
| 29. | ear: number of rows of grain | 5 | 6 | 5 |
| 30. | ear: type of grain | 3 | 4 | 4 |
| 31. | ear: color of top of grain | 9 | 9 | 9 |
| 32. | ear: color of dorsal side of grain | 9 | 9 | 9 |
| 33. | ear: anthocyanin coloration of glumes of cob | 9 | 9 | 9 |
| 34. | ear: intensity of anthocyanin coloration of glumes of cob | 9 | 5 | 7 |

TABLE II

INBRED LINE DEVELOPMENT AND GENEOLOGY

| Cycle | Country** | Plot | Selfing stage | Activity |
|---|---|---|---|---|
| Line: FAR601 - Breeding History ||||||
| 2006/7 | AR | 06AC691049+50 | S7 to S8 | LM* and breeder seed production |
| 2006 | PT | 06AC090155/01+2 | S6 to S7 | inbred fixation |
| 2005/6 | NZ | 05NZ-302/n | S5 to S6 | inbred fixation |
| 2004/5 | NZ | 04AR-151-54 | S4 to S5 | inbred fixation |
| 2004 | FR | IN04-132/n# | S4# | inbred fixation |
| 2003/4 | NZ | 03NZ-14/3 | S3 to S4 | inbred fixation |
| 2003/3 | CL | 02CL-FM-25/1 | S2 to S3 | inbred fixation |
| 2002 | HU | 02HU5723/2 | S1 to S2 | inbred fixation |
| 2001/2 | CL | 01 CL-FM 14/1 | SO to Si | inbred fixation |
| 2001 | DE | rhine valley: spontaneous red corn segregate as SO |||
| Line: FAR045 - Breeding History ||||||
| 2006 | PT | 06FM09007 | S6 to S7 | inbred fixation |
| 2005/6 | NZ | 05NZ-305-02 | S5 to S6 | inbred fixation |
| 2004/5 | NZ | 04AR-165/1 | S4 to S5 | inbred fixation |

TABLE II-continued

INBRED LINE DEVELOPMENT AND GENEOLOGY

| Cycle | Country** | Plot | Selfing stage | Activity |
|---|---|---|---|---|
| 2004 | FR | IN04-145/2 | S4 to S5 | inbred fixation |
| 2002 | HU | 02HU-5188/3 | S3 to S4 | inbred fixation |
| 2001 | HU | 01HU-4010/1 | S2 to S3 | inbred fixation |
| 2000/1 | NZ | OONZ-06/1 | Si to S2 | inbred fixation |
| 2000 | HU | 00HUFM-5287/6 | SO to S1 | inbred fixation |
| 1999 | DE | rhine valley: spontaneous red corn cross into elite germplasm | | |

*LM Line Maintenance;
**AR Argentina, PT Portugal, HU Hungary, CL Chile, DE Germany, NZ New Zealand, FR France

TABLE III

Anthocyanin Proportions of Plant Tissues for Hybrid FAR045xFAR601

| | Plant Tissue | | | | | |
|---|---|---|---|---|---|---|
| Trait | Grain | Husk | Cob | Leaf | Stalk | Total |
| | 2006 | | | | | |
| Total mass | 51% | 8% | 7% | 9% | 25% | 100% |
| Lab pigment (% of mass) | 0.22% | 4.01% | 0.69% | 0.06% | 0.27% | 5.2% |

TABLE III-continued

Anthocyanin Proportions of Plant Tissues for Hybrid FAR045xFAR601

| | Plant Tissue | | | | | |
|---|---|---|---|---|---|---|
| Trait | Grain | Husk | Cob | Leaf | Stalk | Total |
| Harvested mass (tons) | 2.8 | 0.4 | 0.4 | 0.5 | 1.4 | 5.5 |
| Lab pigment (lbs) | 12.3 | 34.1 | 5.6 | 0.6 | 7.6 | 59.9 |
| Lab pigment (% of total) | 21% | 57% | 9% | 1% | 13% | 100% |
| | 2005 | | | | | |
| Total mass | 54% | 7% | 7% | 8% | 24% | 100% |
| Lab pigment (% of mass) | 0.166% | 3.210% | 1.240% | 0.100% | 0.459% | 5.2% |
| Harvested mass (tons) | 2.8 | 0.4 | 0.4 | 0.2 | 0.6 | 4.3 |
| Lab pigment (lbs) | 9.4 | 23.8 | 8.9 | 0.4 | 5.1 | 47.7 |
| Lab pigment (% of total) | 20% | 50% | 19% | 1% | 11% | 100% |

TABLE IV

| Nutrient | Amount | Nutrient | Amount | Nutrient | Amount |
|---|---|---|---|---|---|
| calories | 177.12 | niacin equiv | 3.26 mg | alanine | 0.48 g |
| calories from fat | 18.90 | vitamin B6 | 0.10 mg | arginine | 0.22 g |
| calories from saturated fat | 2.90 | vitamin C | 10.16 mg | aspartate | 0.40 g |
| protein | 5.44 g | vitamin E alpha equivalents | 0.14 mg | cystine | 0.04 g |
| carbohydrates | 41.18 g | vitamin E IU | 0.22 IU | glutamate | 1.06 g |
| carbohydrates | 41.18 g | vitamin E mg | 0.80 mg | glycine | 0.22 g |
| soluble fiber | 0.18 g | folate | 76.10 mcg | histidine | 0.14 g |
| insoluble fiber | 4.42 g | vitamin K | 0.66 mcg | isoleucine | 0.22 g |
| sugar-total | 4.26 g | pantothenic acid | 1.44 mg | leucine | 0.58 g |
| monosaccharides | 1.32 g | calcium | 3.28 mg | lysine | 0.22 g |
| disaccharides | 2.78 g | copper | 0.08 mg | methionine | 0.12 g |
| other carbohydrates | 32.32 g | iron | 1.00 mg | phenyealanin | 0.24 g |
| fat-total | 2.10 g | magnesium | 52.48 mg | proline | 0.48 g |
| saturated fat | 0.32 g | manganese | 0.32 mg | serine | 0.26 g |
| monounsaturated fat | 0.62 g | phosphorus | 168.92 mg | threonine | 0.22 g |
| polyunsaturated fat | 0.98 g | potassium | 408.36 mg | tryptophan | 0.04 g |
| water | 114.10 g | selenium | 1.32 mcg | tyrosine | 0.20 g |
| ash | 1.18 g | sodium | 27.88 mg | valine | 0.30 g |
| vitamin A IU | 355.88 IU | zinc | 0.78 mg | | |
| vitamin A RE | 36.08 RE | 18:0 stearic | 0.02 g | | |
| A-carotenoid | 36.08 RE | 18:1 oleic | 0.62 g | | |
| A-beta carotene | 144.98 mcg | 18:2 linoleic | 0.96 g | | |
| thiamin-B1 | 0.36 mg | 18:3 linoleic | 0.02 g | | |
| riboflavin-B2 | 0.12 mg | omega 3 fatty acids | 0.02 g | | |
| niacin-B3 | 2.64 mg | omega 6 fatty acids | 0.96 g | | |

The technology described herein may be generally characterized according to the following various levels of description. A process is described for extracting at least anthocyanin pigments/dyes from corn kernels to produce a pigment/dye extract having improved stability against hydrolysis. The process includes steps of:

adding corn kernels with (preferably) less than 10% by weight comprised of broken kernels to an aqueous medium to form an aqueous-corn medium;

the corn kernels having in excess of 0.1 mg of anthocyanin pigment/dye per gram of corn kernel therein;

exposing (with or without agitation) the aqueous corn medium at a temperature above 35° C.;

separating solid corn kernels from the aqueous corn medium and forming an extract of anthocyanin in aqueous medium; and concentrating the extract to provide an anthocyanin composition of commercial use. The process is preferably performed wherein the extract before concentration has a pH of less than or equal to 4.5. The extract preferably is provided free of any acids other than the acylated anthocyanins and other acids extracted from or formed by the corn kernels (e.g., some phenolic acids may be extracted). This implies that no acids, and especially no inorganic acids are added in the process to assist in extraction. The process is preferably performed so that, similarly, the extract is provided free of any bases other than those extracted from or formed by the corn kernels. The process is preferably performed so that the anthocyanin pigment/dye in the corn kernel has greater than 70% by weight of anthocyanin as an acid or acylated form of the anthocyanin and the extract is concentrated to provide an anthocyanin composition having greater than 70% acid or acylated form of anthocyanin.

The process can be performed with gentle agitation so that the corn kernels separated from the aqueous corn medium consist of corn kernels with less than 10% of the corn kernels having significant structural damage to the walls of the kernel.

One description of a resulting product from the extraction process is an anthocyanin-containing extract from corn comprising a composition that when present in water as 1% to 90% by weight anthocyanin comprises more than 55% by weight of total anthocyanin as an acid or acylated form of anthocyanin. This extract may comprise more than 70% by weight of total anthocyanin as an acid or acylated form of anthocyanin, and the extract may be free of any acids or bases that are not extracted or formed from corn kernels from which the extract has been made. The extract may have corn used in the process that comprises tissues of FAR601, FAR045, hybrids of FAR601, hybrids of FAR045 or a hybrid of both FAR601 and FAR045.

In a preferred practice of the process, the structural damage is determined by less than 10% of the pericarp, germ and endosperm are disconnected from each other.

An alternative description for a process for extracting at least anthocyanin pigments/dyes from corn kernels to produce a pigment extract having improved stability against hydrolysis comprises:

adding corn kernels with less than 5% by weight comprised of broken kernels to a 99.5% by weight water aqueous medium to form an aqueous-corn medium;

the corn kernels having in excess of 0.1 mg of anthocyanin pigment/dye per gram of corn kernel therein;

the anthocyanin pigment/dye in the corn kernels having greater than 40% by weight of anthocyanin as an acid or acylated form of the anthocyanin;

exposing (with or without agitation) the aqueous corn medium at a temperature above 35° C.;

separating solid corn kernels from the aqueous corn medium and forming an extract of anthocyanin in aqueous medium to form an extract having less than 1.0% solids therein before concentration or purification steps are performed on the extract. In this process, the anthocyanin may have greater than 55% by weight of anthocyanin as an acid or acylated form of the anthocyanin and the extract has less than 0.6% solids therein. In this process, the extract may be a first extract from the kernels and contains less than 5% by weight of the total starch originally in the kernels and greater than 25% by weight of all anthocyanin originally in the kernels.

The composition, extracts and extraction products of the present technology also have unique characteristics. For example, one of these products include an extraction product from corn kernels comprising an aqueous composition having at least 0.5% by weight of anthocyanin content in water, the anthocyanin content characterized as having less than 65% by weight of non-acylated anthocyanin and at least 35% by weight of acylated anthocyanin and at least 11 chromatographic peaks representing distinct anthocyanin compounds. The extraction product may satisfy the legal standards of certified organic according to 7 C.F.R. Part 205; Federal Register, Vol. 65, No. 246, 21 Dec. 2000. The extraction product may have at least 0.5% by weight of anthocyanin content in water, the anthocyanin content characterized as having less than 50% by weight of non-acylated anthocyanin and at least 50% by weight of acylated anthocyanin and at least 14 chromatographic peaks representing distinct anthocyanin compounds. The anthocyanin content of the extraction product may comprise at least 13% by total weight of anthocyanin of cyanidin 3-glucoside and at least 25% by total weight of anthocyanin of cyanidin 3-(6"-malonoyl) glucoside, or comprise at least 5% by total weight of anthocyanin of cyanidin 3-(malonoyl)(malonoyl) glucoside. The extraction product may have at least 2% or at least 4% by weight of the anthocyanin content or more.

The extraction product may be concentrated or dried to a degree that is desired for its ultimate use. It may even be dried to a solid powder or particle having less than 10% by weight of water content. A packaged food product may contain at least 0.005% by weight of solids or liquids of the extraction products described herein in a package (can, container, box, packet, bottle, etc.) with edible ingredients. The packaged food product can be provided to meet the legal standards of 7 C.F.R. Part 205; Federal Register, Vol. 65, No. 246, 21 Dec. 2000 for labeling as organic.

The extraction product in some results may be described as having an anthocyanin distribution comprising:

| Anthocyanins | % |
| --- | --- |
| cyanidin 3-glucoside | 11-16% |
| cyanidin 3-(6"-malonoyl) galactoside | 5-10% |
| peonidin 3-glucoside | 1-5% |
| cyanidin 3-(6"-malonoyl) glucoside | 30-45% |
| cyanidin 3-(malonoyl)(malonoyl) galactoside | 3-6% |
| pelargonidin 3-(malonoyl) glucoside | 2-6% |
| cyanidin 3-(malonoyl)(malonoyl) glucoside | 8-16% |
| peonidin 3-(malonoyl) galactoside | 3-8% |
| peonidin 3-(malonoyl) glucoside | 1-6% |
| pelargonidin 3-(malonoyl)(malonoyl) glucoside | 1-4% |
| cyanidin 3-(malonoyl)(succinoyl) galactoside | 1-4% |
| peonidin 3-(malonoyl)(malonoyl) glucoside | 1-4% |
| cyanidin 3-(malonoyl)(succinoyl) glucoside | 0.5-3% |
| peonidin 3-(succinoyl) glucoside | 0.1-2.5% | or as:

| Anthocyanins | % |
|---|---|
| cyanidin 3-glucoside | 18-32% |
| cyanidin 3-(6"-malonoyl) galactoside | 3-8% |
| peonidin 3-glucoside | 1-6% |
| cyanidin 3-(6"-malonoyl) glucoside | 30-52% |
| cyanidin 3-(malonoyl)(malonoyl) galactoside | 1-5% |
| pelargonidin 3-(malonoyl) glucoside | 0.8-4% |
| cyanidin 3-(malonoyl)(malonoyl) glucoside | 4-10% |
| peonidin 3-(malonoyl) galactoside | 2-8% |
| peonidin 3-(malonoyl) glucoside | 1-6% |
| pelargonidin 3-(malonoyl)(malonoyl) glucoside | 0.2-2% |
| cyanidin 3-(malonoyl)(succinoyl) galactoside | 0.2-2% |
| peonidin 3-(malonoyl)(malonoyl) glucoside | 0.2-2% |
| cyanidin 3-(malonoyl)(succinoyl) glucoside | 0.2-2% |
| peonidin 3-(succinoyl) glucoside | 0.1-1.5% |

The extraction product, because of the method of production, removes the need for significant amounts of additives during extraction, allowing the extraction product to be exempt from certification as a food colorant under 21 C.F.R. 73.260.

Another surprising feature of the present technology is the fact that the extraction product has a commercially acceptable aroma or odor to it, without any extraordinary (e.g., chromatographic) filtering or purification of the direct extract from the corn. This is surprising because, as it was disclosed in EP 1477530A1 (which is incorporated herein by reference in its entirety), corn extracts have significant odor problems and that numerous materials involved with the odors must be removed from the extract to provide a commercially acceptable purified corn color and composition.

EXAMPLES

Pigment Extraction by Whole Kernal Infusion Method

The following working example shows a whole kernel extraction process that removes 50% of total anthocyanins in the kernel without crushing or pulverizing of the kernel during or before the process. This is a significant technical and commercial benefit to the technology. The corn kernel by-product is fundamentally useful and marketable as a corn kernel for both human and agricultural animal consumption, and useful for almost all other commercial and manufacturing processes. The nutritional value, fiber value, lignin content and most other structural and chemical values of the corn kernels has been minimally altered. Additionally, because the pigment has been extracted from essentially whole kernel infused in water, the pigment product is classified differently by the FDA, and could be considered Generally Regarded as Safe (GRAS) for subsequent use in human consumables, cosmetics, pharmaceuticals and the like.

Laboratory Scale Extraction—A 1L Pyrex® glass bottle was used. A mixture was prepared of 40% by weight (dry basis) kernels and 60% by weight deionized water (all percentages will be on a weight-to-weight basis, unless stated otherwise). Actual total solid content was adjusted for moisture by using the following calculation (for a 750 g total weight of kernel and water per 1 L bottle, to allow mixture to flow freely):

750 g×0.40=300 g so 40% of 750 g would be 300 g of dry kernels

As the kernels had a predetermined 12.2% by weight moisture, the actual moisture content was adjusted using the equation below 300 g/((100−12.2)/100), which resulted in a determined amount of 341.6 g kernel solids (342 g rounded up)

The weight of water is therefore 750 g (the total weight of material)−342 g (the total determined weight of solids=408 g water.

A number of 1 L bottles were capped tightly and placed in a reciprocating heated water bath of 60° C. This will be referred to as the first extract. The reciprocating motion is set for 90 rpms. The laboratory water baths allow the placement of six 1 L bottles (large unit) and three 1 L bottles (small unit) at the same time.

Enough water is placed in the water bath to cover most of the surface of the water bottle(s) without allowing the bottles to float. Also, the reciprocation motion is constant and uniform for all bottles.

The extraction results are regularly checked and bottles closure occasionally. The mixture was shaken under 60° C. water for 1.5 hours.

The bottles were removed from the water bath. Each bottle was opened individually and the kernels and liquid were slowly poured through a sieve into a beaker. The sieve was tapped a few times to remove most of the liquid from the kernels. The sieved liquid was saved in a beaker. The kernels were transferred back into the same original 1 L bottles using a large funnel. The same amount of water was added as in the first extraction (as described above) to the kernels in the bottle. These steps were repeated for all bottles. Note that the water content need not be measured again, and if done, that estimate would have to be adjusted for the moisture picked up by the kernels during the prolonged water extraction process.

The refilled bottles were again capped tightly and placed in a reciprocating heated water bath at 60° C. This will be referred to as the second extract. The reciprocating motion is set for 90 rpms. The laboratory water baths allow the placement of six 1 L bottles (large unit) and three 1 L bottles (small unit) at the same time.

Enough water is placed in the water bath to cover most of the surface of the bottle without allowing the bottles to float. It is also made certain that the reciprocating motion is constant and uniform for all bottles.

The extraction and bottles were checked occasionally during the reciprocation. The mixture was shaken under 60° C. water for 1.5 hours.

The bottles were removed from the water bath. Each bottle was opened individually and the kernels and extract were slowly poured through a sieve into a beaker. The sieve was tapped a few times to remove most of the loose liquid from the kernels.

All first extracts were combined (e.g., the six decanting from the large unit and/or the three liquid samples removed from the small unit). First, the combined extracts were passed through a coarse filter under vacuum (e.g., through a Whatman #4 filter paper) followed by a finer filtration through a glass microfiber filter. The amount of filtrate obtained was measured using a graduate cylinder. The total recovered value was recorded and the percentage of recovered filtrate was calculated and recorded (based on total starting water volume).

Similarly, all second extracts were combined. Again there was a first, coarse filtration under vacuum through a Whatman #4 filter paper followed by a finer filtration through a glass microfiber filter. The amount of filtrate obtained was measured using a graduate cylinder. The total recovered value was recorded and the percentage of recovered filtrate was calculated and recorded (based on total starting water volume).

Individual samples were collected (15 ml of each first and second extracts) and placed separately into labeled amber vials for future analysis of Color Units and % filtrate solids. Label vials $1^{st}$ extract and $2^{nd}$ extract plus dates.

Any remaining first and second extracts were mixed and the volume recorded (+30 ml) using a graduate cylinder. Fifteen (15) ml of this mixture was collected and placed into a labeled amber vial for future analysis of Color Units and % filtrate solids. Label vials $1^{st}+2^{nd}$ extracts plus dates.

Each filtrate was placed in a dark container in a refrigerator until enough volume was accumulated to dry or concentrate. A forced-air oven at 55° C. at an intermediate airflow (e.g., 4 on a scale of 0-10) was used to concentrate the material.

A chemical analysis was performed by an independent testing laboratory using dried first water extracts only (Brunswick Laboratories, Norton, Mass.). The results were reported for percentages of fourteen (14) different anthocyanins found in the extract, the breakdown of percentages of the anthocyanins and the acid or acylated form of the anthocyanins as determined by chromatographic separation techniques, as well as the total anthocyanin content of the dried material. These results are shown in FIG. 1. The salient results are summarized below. The total anthocyanin in the dried extract was 25.4 mg/g for (FAR045*044)(FAR601), 34.9 mg/g for FAR045*FAR601 and 52.0 mg/g for the Peruvian corn (Kculli—Essential Living Foods). However, in the case of the Peruvian corn (Kculli), the resulting product under the same extraction conditions would likely be far less stable and less commercially useful because of the higher proportionality of non-acylated anthocyanins. As an example of the potential anthocyanin content, a particular current red corn variety (FAR601) yielded approximately 100 mg/g of anthocyanin for the dried first extract only under the same extraction conditions.

| Corn Species | | Sugar % (overall) | Acid/Acylated % (overall) |
|---|---|---|---|
| | Highest Anthocyanin % | | |
| Peruvian Corn (Kculli) | Cyanidin 3-glucoside (43.1%) | 48.8 | 51.2 |
| FAR045*FAR601 | Cyanidin 3 (6"-malonyl) glucoside (42.4%) | 29.1 | 70.9 |
| (FAR045*044)(FAR601), | Cyanidin 3 (6"-malonyl) glucoside (38.1%) | 16.2 | 83.8 |
| | 2nd Highest Antho % | | |
| Peruvian Corn (Kculli) | Cyanidin 3 (6"-malonyl) glucoside (31.6%) | | |
| FAR045*FAR601 | Cyanidin 3-glucoside (25.7%) | | |
| (FAR045*044)(FAR601), | Cyanidin 3-glucoside (13.7%) | | |

As seen on the table above, the presence of the higher proportions of the acid or acylated forms (especially diacylated) such as the Cyanidin 3-(6"-malonyl) glucoside, cyanidin 3-(6"-malonyl) galactoside, cyanidin 3-(malonyl)(malonyl) glucoside, cyanidin 3-(malonyl)(succinoyl) glucoside, pelargonidin 3-(malonyl)(malonyl) glucoside. Peonidin 3-(malonyl)(malonyl) glucoside and the like, as compared to the non-acylated anthocyanins provides a better pigment product. The acid or acylated forms provide pigments and compositions that are more stable to ambient light (and UV and IR radiation), heat and hydrolysis (chemical reaction) than the non-acylated counterparts.

One concept and practice within the scope of the preferred practices of the present invention is the ability and even preference of using kernels of high anthocyanin and high acylated anthocyanin content and varied anthocyanin content. The high acid content (the high percentage of acid or acylated forms of the anthocyanins, such as greater than 55%, greater than 60%, greater than 65%, greater than 70%, greater than 75% and even greater than 80% as compared to the total weight of anthocyanins) of the kernels enables both effective extraction of useful amounts of pigments/dyes from the kernels, extraction without crushing or physical damage to the kernels, and the ability to extract commercially viable amounts of pigment/dye from the kernel only, without having to extract (with crushing) from leaf, stem, cob, husk and root of the plant. The naturally high acid content of the pigments/dyes in the kernels of these species also removes the need for acid addition to the extraction liquid. As shown in the above examples, no acid and no base were added to the added liquid (here, water only was used). This reduces costs, reduces unnecessary by-products, reduces chemicals reactions with the pigments/dyes, reduces chemical action on the kernels (enabling them to be used in commercial and consumable products without further treatment other than drying to a storable moisture content), and provides additional advantages that have not previously been enabled in the use of corn to provide pigments/dyes of the anthocyanin class.

If acids are used in the extraction process, they may be used in amounts and concentrations that preferably do not significantly alter the stable pH of the extractant solution formed from the kernels in pure water. For example, the solutions derived from the first extraction in the examples above may have a pH of 4.0 with the FAR045*601 corn variety. If acids were used in the extraction liquid, the acid should be present in amounts less than that which would reduce the pH by more than 1.0 (e.g., to 3.0), more preferably less than that which would reduce the pH by more than 0.75 (e.g., to 3.25), and more preferably to amounts that would reduce the pH by more than 0.5 (e.g., to 3.5). If bases were present, they should be used in amounts that would comparably not raise the pH.

Another concept and practice within the scope of the preferred practices of the present invention is the ability and even preference of using kernels with minimal structural damage when introduced into the extraction process and removed from the extraction process. This is referred to herein as the corn kernels being introduced and separated from the aqueous corn medium where the kernels consist essentially of or consist of corn kernels with less than 10% of the corn kernels having significant structural damage to the walls of the kernel. Although the terminology may seem subjective, it has objective bases that can be determined by observation and recording techniques when standards are applied. These determinations may be made with automated systems, such as those described in "Machine Evaluation of Corn Kernel Mechanical and Mold Damage" Published by the American Society of Agricultural and Biological Engineers, St. Joseph, Mich. www.asabe.org: Transactions of the ASAE. VOL. 41(2):415-420. @1998; Authors: H. F. Ng, W. F. Wilcke, R. V. Morey, J. P. Lang. In this disclosure, machine vision algorithms were developed for measuring corn (Zea mays) kernel mechanical damage and mold damage. Mechanical damage was determined using both single-kernel and batch analysis by extracting from kernel images the damaged area stained by green dye and by calculating the percentage of total projected kernel surface area that was stained green. Mold damage was determined using single-kernel analysis by isolating the moldy area on kernel images and by calculating the percentage of total projected kernel surface area covered by mold. The vision system demonstrated high accuracy and consistency for both mechanical and mold damage measurement. The standard deviation for machine vision system measurements was less than 5% of the mean value, which is substantially smaller than for other damage measurement methods.

Similarly, even surface damage only can be determined. Surface damage may be a criteria used to assure that highest quality parameters are met in the extraction mechanism as disclosed in "Identification and Detection for Surface Cracks of Corn Kernel Based on Computer Vision", published by the American Society of Agricultural and Biological Engineers, St. Joseph, Mich. www.asabe.org Citation: 2007 ASAE Annual Meeting 073090; Junxiong Zhang, Yi Xun, Wei Li. In this disclosure, surface cracks detection of corn kernel was studied based on BP neural network segmentation of surface color characteristics and morphology algorithm. The seeds of NongDa-4967 and NongDa-3138 (two novel varieties of corn developed by China Agricultural University) were taken as research objectives. Firstly, binary image including the information of cracks, boundary and non-cracks were obtained by horizontal and vertical Sobel operators. Subsequently, by analyzing the color characteristics, a BP neural network model with three layers was built. R, G, B color components were the inputs of the network, and the outputs were background, corn kernel tip cap and other parts. The tip point of the kernel could be identified from the kernel tip cap. A majority of non-cracks information was eliminated by subtracting a circular area with the tip point as the center. Finally, according to the crack lengths and positions, the crack was extracted, and the lengths were calculated. An experiment has been carried out with 80 kernels with cracks and 80 kernels without cracks selected from NongDa-4967 and NongDa-3138 respectively. The identification results showed that the surface cracks detection of corn kernels could be realized and the detecting accuracy was 92.5% and 88.8%.

The actual extent of damage and the degree of damage can be set as parameters in the determination of the degree of damage that have been set as limits. Specific parameters that are meaningful can be selected, and provided here as non-limiting examples, with parameters based upon one or more essential parts of the kernel, the pericarp (the tough, protective layer surrounding the kernel), germ (the root development region, usually comprising the scutellum, plumule, radicle and radicle cap) and endosperm (having two parts, the transparent horny region and the opaque floury region). A simple and easily determined set of parameters is that all portions of the pericarp, germ and endosperm remain connected. A more stringent set of parameters would be that the pericarp, germ and endosperm remain connected and less than 10% or less than 5% of the pericarp shows crack damage that is visible with the naked eye, or the pericarp, germ and endosperm remain connected and less than 10% or less than 5% of the germ shows separation cracks with the pericarp. Other bases of determination of unbroken is that, with the pericarp/seed coat removed, at least 90%, at least 92%, preferably at least 95%, and most preferably at least 98% of the hyaline layer remains intact and unbroken. Other percentages may be used (such as 1%, 15%, 20%, 25%, 40% and the like) depending upon how loose or how stringent are the appearance quality restrictions applied to the kernels after (and before) the extraction process. These percentages can be observed visually (e.g., through a magnifying glass or low power 2-5× microscope is sufficient) and determined on an observational basis.

The following tables and discussions present further information of the nature of results of the processes described herein and further indications of actual values and measurements that are indicative of the unique process and products described herein.

The following tables show a) the results for pH of the extract for three different kernel materials containing different levels of acylation using deionized water and b) results for the % solids after filtration of combined first and second extractions from whole kernel corn (of identified species) as compared to ground kernels at two different extraction temperatures. Results in Table A show that the acylated anthocyanins extracted out of the kernel by the deionized water have enough acidic functionality to bring the pH into the levels shown. The material with higher acylation yielded the lowest overall extract pH.

TABLE A pH of Extracts from Three Corn Varieties

| Corn Species | Filtrate pH | Acylation |
|---|---|---|
| FAR045*044) (FAR601 | 3.89-3.96 | Highest |
| FAR045*FAR601 | 4.00-4.15 | Medium |
| Peruvian Corn (Kculli) | 4.50-4.53 | Lowest |

TABLE B

Extractions - Whole versus Ground Kernels (FAR045*FAR601)

| Species | % Starting solids | Extraction T (° C.) | % Solids First extract | Mono Antho (mg/L) | Color Units |
|---|---|---|---|---|---|
| Whole | 40 | 60 | 0.40-0.50 | 130-160 | 7-10 |
| Ground | 10 | 60 | 1.11-1.15 | 22-24 | 1 |
| Whole | 40 | 37 | 0.20-0.21 | 37-39 | 2 |
| Ground | 10 | 37 | 0.78-0.80 | 11-12 | 1 |

Extraction of the ground corn at higher than 15-20% starting solids is not an efficient process due to high water absorption and low filtrate recovery. Whole kernel extraction allows for efficiencies at higher concentrations of starting solids, which in turn allows for lower water removal costs. These data show lower % filtrate solids resulting from whole kernel extraction processes, even with higher starting material input.

The composition table below (Table C) shows the test results for corn kernels from different corn varieties as well as the result for the by-product of the two extractions following the whole kernel methodology previously detailed.

TABLE C

Composition - Kernels (Raw Materials and By-Product)

| Species | Oven Moisture | Oil | Protein | Starch | EtOH Test |
|---|---|---|---|---|---|
| FAR045*FAR601 | 9.81% | 4..34% | 10.13% | 74.1% | NA |
| FAR045*044) (FAR601 | 10.75% | 4.18% | 10.06% | 73.2% | NA |
| FAR045*FAR601 By-Product | 14.04% | 4.26% | 9.68% | 72.1% | 2.720 |
| Common yellow corn | 8-17% | 3-8% | 6-16% | 62-75% | 2.5-2.9 |

The results show that the oil, protein and starches of the extracted material is comparable to the same values found for the unextracted (raw) kernels for the FAR045*FAR601. The extracted kernel can be dried to any moisture desired/required by the particular applications. The ethanol fermentation test shown indicates that the by-product material has applications in the ethanol producing areas since it falls within the typical values of 2.5-2.9 gallons per bushel. Typical ranges of such composition parameters using commonly used corn varieties are reported by an analytical laboratory (Illinois Crop Improvement) as shown above. Note that the range of values may vary due to methodology as well.

The oven moisture is the moisture found from the ground whole kernel. The oil content was determined by oil-ether extraction. The protein test is the Kjeldahl method. The EtOH test was an ethanol fermentation test used to measure the ethanol yield in gallons per bushel of corn. The methodology used for the ethanol test was as described by the Illinois Crop Improvement analytical laboratory in the following manner: "The standard ethanol fermentation test is done using the typical dry-grind method. Corn is ground, slurried with water and enzyme, and cooked. This process is referred to as liquefaction as it produces a pumpable mixture of solubilized starch and begins to break the long starch molecules down into smaller pieces (dextrins). This slurry is then cooled. The acidity level is adjusted for optimum fermentation, and nutrients for use by the yeast are added. The test utilizes simultaneous saccharification and fermentation (SSF). A second enzyme is added along with yeast inoculum. This begins the process of breaking the dextrins into glucose molecules that can be converted by yeast into ethanol. The laboratory fermentation process takes 64 hours. Ethanol yield is determined by the loss in weight of the sample from the beginning of fermentation (yeast addition) to the fermentation cutoff time. As the starch (now glucose) is consumed by the yeast, liquid ethanol and carbon dioxide gas are formed in constant ratio and in nearly equal amounts by weight. The carbon dioxide bubbles out of the mixture and is vented to the surroundings, so the loss of weight can be converted to grams of ethanol produced. This method has been compared to HPLC measurement of ethanol concentration after fermentation, with generally higher yields but more consistent repeatability. Coefficients of variation for replicates are less than 1%." Ethanol yield is reported as gallons of 200 proof undenatured ethanol per bushel (56 lb) of corn at 15% moisture content. Possible values are 1.7-3.0 gallons per bushel. Typical Results 2.55-2.90 gallons per bushel.

The hybrid FAR045*FAR601 was grown near Lamberton, Minn. in 2005 and 2006. Tissues from representative plants were sampled to determine anthocyanin concentrations extracted from each tissue. The plants were harvested near the black layer stage of maturity (late silage stage) on Sep. 30 in 2005 and Oct. 1 in 2006. In each year, samples from the tissues termed seed, husk, cob, leaf, and stalk were taken, chopped by hand and air dried at about 50° C. The samples were ground in a Waring blender, then further ground in a Retsch Mill. The ground samples were subsequently immersed in an extraction solution or solvent (50:50 water: ethanol, by volume having 0.1M HCl) and stirred or agitated at about 37° C. After about 1.5 hours of agitation in the extraction solution, the resulting slurry was filtered through a nylon mesh screen, then through a Whatman #4 filter paper and assayed for proportion of anthocyanins present. The portions of hybrid plants were then assayed for anthocyanin content. The results are shown in Table IV.

TABLE IV

Anthocyanin Proportions of Plant Tissues for Hybrid FAR045 × FAR601

| | Plant Tissue | | | | | |
|---|---|---|---|---|---|---|
| Trait | Seed | Husk | Cob | Leaf | Stalk | Total |
| | 2006 | | | | | |
| Total mass | 51% | 8% | 7% | 9% | 25% | 100% |
| Lab pigment (% of mass) | 0.22% | 4.01% | 0.69% | 0.06% | 0.27% | 5.2% |
| Harvested mass (tons) | 2.8 | 0.4 | 0.4 | 0.5 | 1.4 | 5.5 |
| Lab pigment (lbs) | 12.3 | 34.1 | 5.6 | 0.6 | 7.6 | 59.9 |
| Lab pigment (% of total) | 21% | 57% | 9% | 1% | 13% | 100% |
| | 2005 | | | | | |
| Total mass | 54% | 7% | 7% | 8% | 24% | 100% |
| Lab pigment (% of mass) | 0.166% | 3.210% | 1.240% | 0.100% | 0.459% | 5.2% |
| Harvested mass (tons) | 2.8 | 0.4 | 0.4 | 0.2 | 0.6 | 4.3 |
| Lab pigment (lbs) | 9.4 | 23.8 | 8.9 | 0.4 | 5.1 | 47.7 |
| Lab pigment (% of total) | 20% | 50% | 19% | 1% | 11% | 100% |

In 2006, a greater amount and percentage of pigment was present. However, in both years most of the anthocyanin extracted was from the husks, followed by that from the seed. Other significant amounts of anthocyanin were obtained from the cob and stalk tissues and very little from the leaves.

WORKING EXAMPLE 3

The inbreds FAR045 and FAR601 were assayed by Bio-Diagnostics, Inc., River Falls, Wis., for isozyme genotype using methods known to a person of ordinary skill in the art, e.g., protocols described by Stuber et al, "Techniques and Scoring Procedures for Starch Gel Electrophoresis of Enzymes from Maize (Zea mays L.)," Technical Bulletin #286, North Carolina Agricultural Research Service, North Carolina State University, Raleigh, N.C. (1988). The results of this assay are shown in Table V.

TABLE V

| Variety | ADH1 | ACP1 | AMP1 | AMP3 | GLU1 | IDH1 | IDH2 | MDH1 |
|---|---|---|---|---|---|---|---|---|
| FAR045 | 4/4 | 2/2 | 4/4 | 4/4, 4/5, 5/5 | 7/7 | 4/4 | 6/6 | 1/1, 1/6, 6/6 |
| FAR601 | 4/4 | 4/4 | 4/4 | 3/3 | 7/7 | 4/4 | 4/4 | 6/6 |

| Variety | MDH2 | MDH3 | MDH4 | MDH5 | PDG1 | PDG2 | PGM1 | PGM2 |
|---|---|---|---|---|---|---|---|---|
| FAR045 | 3/3 | 16/16 | 12/12 | 12/12 | 3.8/3.8 | 5/5 | 9/9 | 4/4 |
| FAR601 | 6/6 | 16/16 | 12/12 | 12/12 | 3.8/3.8 | 5/5 | 9/9 | 4/4 |

The inbreds FAR045 and FAR601 had differing alleles for ACP1, AMP3, IDH2, AMP3, and MDH2. FAR045 was still segregating at AMP3 with two alleles present showing the expected two homozygotes and the single heterozygote. However, a person of ordinary skill in the art will readily recognize that FAR045 could be selected for homozygous individuals at the AMP3 locus to thereby identify individuals breeding true for either of the alleles found here. A person of ordinary skill in the art will also recognize that other FAR045 and FAR601 plants may have other isozyme genotypes and nonetheless be within the spirit and scope of this invention.

WORKING EXAMPLE 4

The composition of the seeds (kernels) of the inbreds FAR601, FAR045, their hybrid and another hybrid having a different, single cross female inbred parent, FAR045*FAR044 was determined. In each case, the male (pollen) parent was FAR601. The results of this assay are shown in Table VI.

TABLE VI

| Composition - Kernels | | | | |
|---|---|---|---|---|
| | Oven Moisture (ground) | Oil (oil-ether extraction) | Protein | Starch |
| FAR045*FAR601 | 9.81% | 4.34% | 10.13% | 74.1% |
| FAR045*FAR044)(FAR601 | 10.75% | 4.18% | 10.06% | 73.2% |
| FAR601 | 12.93% | 4.90% | 11.08% | 70.1% |
| FAR045 | 10.98% | 3.76% | 12.48% | 67.2% |

Kernels of the two hybrids and two inbreds were as expected for oil and starch percentages, but were higher than expected for protein percentages, based on yellow dent corn grades encountered in the upper Midwest of the United States. See, e.g., Corn: Chemistry and Technology, Stanley A. Watson and Paul E. Ramstad Editors, American Association of Cereal Chemists, Inc., St. Paul, Minn. (1987), page 72, Table IV.

WORKING EXAMPLE 5

Seeds/kernels from the inbreds FAR045 and FAR601 and from the hybrid FAR045*FAR601 were extracted using water:acetic acid:acetonitrile:trifluoroacetic acid (V/V) at respective ratios 848:100:50:2. The kernels were extracted for six hours at ambient temperature, then stored at a temperature of about 5° C. for about three days, then filtered. The extract was then subjected to high performance liquid chromatography to determine proportions of anthocyanin constituents and compared to the results of Working Example 6 below. Results of this assay are presented in Table VII.

TABLE VII

| peak no. | Anthocyanin | Ret Time | % Area (080429 MPA Extraction) | | |
|---|---|---|---|---|---|
| | | | FAR045*FAR601 | FAR601 | FAR045 |
| 1 | cyanidin 3-glucoside | 11.0 | 35.4 | 29.06 | 9.51 |
| 2 | Unknown | 14.8 | 1.12 | 0.99 | |
| 3 | Unknown | 16.1 | 1.30 | 1.00 | 1.13 |
| 4 | Unknown | 16.7 | 2.29 | 1.03 | |
| 5 | cyanidin 3-(6"-malonoyl) galactoside | 17.5 | 5.98 | 6.27 | 5.96 |
| 6 | peonidin 3-glucoside | 19.9 | 4.17 | 4.03 | |
| 7 | cyanidin 3-(6"-malonoyl) glucoside | 22.0 | 32.37 | 33.22 | 35.73 |
| 8 | cyanidin 3-(malonoyl)(malonoyl) galactoside | 26.0 | 1.05 | 1.25 | 17.61 |
| 9 | pelargonidin 3-(malonoyl) glucoside | 26.7 | 1.21 | 1.44 | 2.50 |
| 10 | Unknown | 27.4 | 2.17 | 1.29 | |

TABLE VII-continued

| peak no. | Anthocyanin | Ret Time | % Area (080429 MPA Extraction) FAR045*FAR601 | FAR601 | FAR045 |
|---|---|---|---|---|---|
| 11 | cyanidin 3-(malonoyl)(malonoyl) glucoside | 28.3 | 5.76 | 9.19 | 21.13 |
| 12 | peonidin 3-(malonoyl) galactoside | 30.2 | 3.63 | 4.29 | |
| 13 | pelargonidin 3-(malonoyl)(malonoyl) glucoside | 34.3 | 0.49 | 0.49 | |
| 14 | cyanidin 3-(malonoyl)(succinoyl) galactoside | 35.8 | 0.60 | 1.22 | 0.73 |
| | Total | | 97.54 | 94.77 | 94.30 |
| Total % Non Acylated | | | 39.57 | 33.09 | 9.51 |
| Total % Acylated | | | 60.43 | 66.91 | 90.49 |
| Total Peaks | | | 19 | 33 | 11 |
| Total Area (relative concentration of Anthocyanin) | | | 11000 | 54750 | 1570 |
| Injection Volume (microliter) | | | 20 | 20 | 100 |

These results confirm that FAR601 produces very high amounts of anthocyanins which are extractible using only water. While FAR045 has a visually dark red pigmentation, which is almost as intense at that of FAR601, it produces a lower amount of extractible anthocyanins. By way of illustration and not limitation, it is presently postulated that acylated anthocyanins are less soluble in water and may be more tightly bound to plant tissues or plant cell components. Consequently, the higher concentrations of acylated anthocyanins present in FAR045 may result in the lower anthocyanin concentrations present in the extracts from this inbred.

WORKING EXAMPLE 6

Kernels from hybrids FAR045*FAR601 and FAR045*FAR044)(FAR601 and the variety Kculli were assayed for anthocyanin content and constituents by Brunswick Laboratories, Norton, Mass. The assay compositions were extracted from corn (maize) seed samples harvested in 2006 and 2007 and from the cultivar Kculli. The protocol included a first extraction of 40% (dry weight) of whole kernel corn using 60% of deionized water at a low shear mixing action at 60° C. for 1.5 hours. No other ingredients were present in the extracting solution other than deionized water. The solution was then filtered from the corn and set aside and dried. Anthocyanin constituents were then determined by high performance liquid chromatography and are presented in Table VII. Total anthocyanin concentrations are shown in Table VIII.

TABLE VII

| Anthocyanin | % anthocyanin | | |
|---|---|---|---|
| | FAR045*FAR044) (FAR601 | FAR045*FAR601 | Kculli* |
| cyanidin 3-glucoside | 13.7 | 25.7 | 43.1 |
| cyanidin 3-(6"-malonoyl) galactoside | 7.2 | 5.2 | 1.7 |
| peonidin 3-glucoside | 2.5 | 3.4 | 5.7 |
| cyanidin 3-(6"-malonoyl) glucoside | 38.1 | 42.4 | 31.6 |
| cyanidin 3-(malonoyl)(malonoyl) galactoside | 4.3 | 2.8 | 1.4 |
| pelargonidin 3-(malonoyl) glucoside | 4.0 | 2.0 | 2.7 |
| cyanidin 3-(malonoyl)(malonoyl) glucoside | 13.4 | 7.6 | 2.1 |
| peonidin 3-(malonoyl) galactoside | 5.5 | 4.2 | 4.4 |
| peonidin 3-(malonoyl) glucoside | 3.5 | 3.1 | 4.3 |
| pelargonidin 3-(malonoyl)(malonoyl) glucoside | 2.0 | 0.6 | 0.4 |
| cyanidin 3-(malonoyl)(succinoyl) galactoside | 2.1 | 1.1 | 0.9 |
| peonidin 3-(malonoyl)(malonoyl) glucoside | 2.0 | 0.8 | 0.5 |
| cyanidin 3-(malonoyl)(succinoyl) glucoside | 1.2 | 0.6 | 0.7 |
| peonidin 3-(succinoyl) glucoside | 0.5 | 0.3 | 0.6 |

*Essential Living Foods, Santa Monica, CA 90401.

Other properties of the various hybrids in Table VII are described in the following Table VIII.

TABLE VIII

| Corn Hybrid or Variety | Total Anthocyanin (mg/g) |
|---|---|
| FAR045*FAR044)(FAR601 | 25.4 |
| FAR045*FAR601 | 34.9 |
| Kculli | 52.0 |

WORKING EXAMPLE 7

Ground isolated pericarp/seed coat of the hybrid FAR045*FAR601 was extracted using water, heat and agitation, then filtered and concentrated approximately 10 fold using roto-evaporation. The analysis is presented in Table IX.

TABLE IX

| | |
|---|---|
| Total Anthocyanins | 0.5-4% |
| Ash | 1-4% |
| Fat | 0.5-4% |
| Protein | 0.5-4% |
| Carbohydrates | 10-30% |
| Moisture | 54-87% |

*Anthocyanin calculation based on cyanidin-3-glucoside.
*Composition analysis performed by Food Safety Net Services in San Antonio, TX

WORKING EXAMPLE 8

Anthocyanins were extracted from seeds of FAR045, FAR601, and the hybrid FAR045*FAR601 by the extraction protocol of Working Example 6. The anthocyanin concentration is given below. The values were calculated in terms of absorbance as measured by a spectrophotometer at 510 nm. The results of this assay are shown in Table X.

TABLE X

| | Anthocyanin Concentration |
|---|---|
| | Anthocyanin(mg/g) |
| FAR045*FAR601 | 0.27 |
| FAR601 | 1.1 |

The aqueous protocol (working example 6) failed to extract sufficient quantities of anthocyanins from FAR045. Accordingly, no results are shown for this inbred. These results show that FAR601 has high amounts of aqueous extractible anthocyanins, higher than the hybrid FAR045*FAR601.

Extraction products according to the present technology can be expected to display a range of composition, depending upon time, temperature, agitation and the like of:

TABLE XI

| Anthocyanin | FAR045*FAR601 | FAR045*FAR044) (FAR601 |
|---|---|---|
| cyanidin 3-glucoside | 11-16% | 18-32% |
| cyanidin 3-(6"-malonoyl) galactoside | 5-10% | 3-8% |
| peonidin 3-glucoside | 1-5% | 1-6% |
| cyanidin 3-(6"-malonoyl) glucoside | 30-45% | 30-52% |
| cyanidin 3-(malonoyl)(malonoyl) galactoside | 3-6% | 1-5% |
| pelargonidin 3-(malonoyl) glucoside | 2-6% | 0.8-4% |
| cyanidin 3-(malonoyl)(malonoyl) glucoside | 8-16% | 4-10% |
| peonidin 3-(malonoyl) galactoside | 3-8% | 2-8% |
| peonidin 3-(malonoyl) glucoside | 1-6% | 1-6% |
| pelargonidin 3-(malonoyl)(malonoyl) glucoside | 1-4% | 0.2-2% |
| cyanidin 3-(malonoyl)(succinoyl) galactoside | 1-4% | 0.2-2% |
| peonidin 3-(malonoyl)(malonoyl) glucoside | 1-4% | 0.2-2% |
| cyanidin 3-(malonoyl)(succinoyl) glucoside | 0.5-3% | 0.2-2% |
| peonidin 3-(succinoyl) glucoside | 0.1-2.5% | 0.1-1.5% |

1. Deposits

Applicant has made a deposit of at least 2500 seeds of Inbreds FAR045 and FAR601 with the American Type Culture Collection (ATCC), Manassas, Va. 20110 USA, ATCC Deposit Nos. PTA-9274 and PTA-9275, respectively. The seeds deposited with the ATCC on Jun. 19, 2008 were taken from the deposit maintained by Red Rock Genetics, LLC, 41295 County Road 54, Lamberton, Minn. 56152 since prior to the filing date of this application. Access to this deposit will be available during the pendency of the application to the Commissioner of Patents and Trademarks and persons determined by the Commissioner to be entitled thereto upon request. Upon allowance of any claims in the application, the Applicant will make the deposit available to the public pursuant to 37 C.F.R. §1.808. This deposit of the Inbreds FAR045 and FAR601 will be maintained in the ATCC depository, which is a public depository, for a period of 30 years, or 5 years after the most recent request, or for the enforceable life of the patent, whichever is longer, and will be replaced if it becomes nonviable during that period. Additionally, Applicant has satisfied all the requirements of 37 C.F.R. §§1.801-1.809, including providing an indication of the viability of the sample upon deposit. Applicant has no authority to waive any restrictions imposed by law on the transfer of biological material or its transportation in commerce. Applicant does not waive any infringement of Applicant's rights granted under this patent.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

Although specific compositions, species, varieties, times, temperatures, steps, order of steps and apparatus are shown in the examples and described in the disclosure, these statements are not intended to limit the scope of the generic invention described herein, but are intended to enable practice of generic concepts represented by generic interpretation of terms in the claims.

The invention claimed is:

1. An aqueous extraction product from dry hybrid corn kernels, the extraction product comprising at least 0.5% anthocyanins by weight of the extraction product, wherein the anthocyanins are comprised of at least 35% acylated anthocyanins and the chromatographic profile of the anthocyanins in the extraction product has at least 11 chromatographic peaks representing distinct anthocyanin compounds, wherein the corn kernels are selected from the group consisting of hybrids of PTA-9274 and PTA-9275.

2. The extraction product of claim 1 that satisfies the legal standards of certified organic according to 7 C.F.R. Part 205; Federal Register, Vol. 65, No. 246, 21 Dec. 2000.

3. The extraction product of claim 2 comprising a solid powder or particle having less than 10% by weight water content.

4. The extraction product of claim 1 having at least 0.5% by weight of anthocyanin content to water, the anthocyanin content characterized by chromatographic technique as having less than 40% by weight of non-acylated anthocyanin and at least 60% by weight of acylated anthocyanin and the chromatographic profile of the anthocyanins in the extraction product has at least 14 chromatographic peaks representing distinct anthocyanin compounds.

5. The extraction product of claim 4 wherein the extract complies with 21 C.F.R. 73.260 as a food colorant.

6. The extraction product of claim 1 wherein the anthocyanin content comprises at least 10% by total weight of anthocyanin of cyanidin 3-glucoside and at least 25% by total weight of anthocyanin of cyanidin 3-(6"-malonoyl)glucoside.

7. The extraction product of claim 1 wherein the anthocyanin content comprises at least 5% by total weight of anthocyanin of cyanidin 3-(malonoyl)(malonoyl)glucoside.

8. The extraction product of claim 2 that satisfies the legal standards of certified organic according to 7 C.F.R. Part 205; Federal Register, Vol. 65, No. 246, 21 Dec. 2000.

9. The extraction product of claim 1 having at least 2% by weight of the extraction product as anthocyanin content.

10. The extraction product of claim 1 having at least 4% by weight of the extraction product as anthocyanin content.

11. The extraction product of claim 10 that satisfies the legal standards of certified organic according to 7 C.F.R. Part 205; Federal Register, Vol. 65, No. 246, 21 Dec. 2000.

12. The extraction product of claim 1 comprising a solid powder or particle having less than 10% by weight water content.

13. A packaged food product containing at least 0.005% by weight of the extraction product of claim 12 in a package with edible ingredients, the extraction product being combined with edible ingredients in addition to the extraction product.

14. The packaged food product of claim 13, in which the food product meets the legal standards of 7 C.F.R. Part 205; Federal Register, Vol. 65, No. 246, 21 Dec. 2000 for labeling as organic.

15. The extraction product of claim 1 having an anthocyanin distribution comprising: cyanidin 3-glucoside 11-16% cyanidin 3-(6"-malonoyl) galactoside 5-10% peonidin 3-glucoside 1-5% cyanidin 3-(6"-malonoyl) glucoside 30-45% cyanidin 3-(malonoyl)(malonoyl) galactoside 3-6% pelargonidin 3-(malonoyl) glucoside 2-6% cyanidin 3-(malonoyl)(malonoyl) glucoside 8- -16% peonidin 3-(malonoyl) galactoside 3-8% peonidin 3-(malonoyl) glucoside 1-6% pelargonidin 3-(malonoyl)(malonoyl) glucoside 1-4% cyanidin 3-(malonoyl)(succinoyl) galactoside 1-4% peonidin 3-(malonoyl)(malonoyl) glucoside 1-4% Cyaniding 3-(malonoyl)(succinoyl) glucoside 0.5-3% peonidin 3-(succinoyl) glucoside 0.1-2.5%.

16. The extraction product of claim 1 having an anthocyanin distribution comprising: cyanidin 3-glucoside 18-32% cyanidin 3-(6"-malonoyl) galactoside 3-8% peonidin 3-glucoside 1-6% cyanidin 3-(6"-malonoyl) glucoside 30-52% cyanidin 3-(malonoyl)(malonoyl) galactoside 1-5% pelargonidin 3-(malonoyl) glucoside 0.8-4% cyanidin 3-(malonoyl)(malonoyl) glucoside 4-10% peonidin 3-(malonoyl) galactoside 2-8% peonidin 3-(malonoyl) glucoside 1-6% pelargonidin 3-(malonoyl)(malonoyl) glucoside 0.2-2% cyanidin 3-(malonoyl)(succinoyl) galactoside 0.2-2% peonidin 3-(malonoyl)(malonoyl) glucoside 0.2-2% cyanidin 3-(malonoyl)(succinoyl) glucoside 0.2-2% peonidin 3-(succinoyl) glucoside 0.1-1.5%.

17. The extraction product of claim 1 wherein the extract complies with 21 C.F.R. 73.260 as a food colorant.

18. The extraction product of claim 1 which is dried to a solid powder.

19. The extraction product of claim 1 in which 68% to 81% of the total molecular percentage of anthocyanins are acylated.

20. The extraction product of claim 1 in which 79% to 88% of the total molecular percentage of anthocyanins are acylated.

21. The extraction product of claim 1 wherein the chromatographic profile of the anthocyanins in the extraction product has at least 14 chromatographic peaks representing at least 14 distinct anthocyanin compounds.

22. The water extraction product of claim 21 in which 68% to 81% of the total molecular percentage of anthocyanins are acylated.

23. The water extraction product of claim 21 in which 79% to 88% of the total molecular percentage of anthocyanins are acylated.

24. A packaged food product containing at least 0.005% by weight of the extraction product of claim 1 in a package, the extraction product being combined with edible ingredients in addition to the extraction product.

25. The packaged food product of claim 24, in which the food product meets the legal standards of 7 C.F.R. Part 205; Federal Register, Vol. 65, No. 246, 21 Dec.2000 for labeling as organic.

26. A personal cosmetic product comprising at least 0.005% by weight of the extraction product of claim 1 in a package with cosmetic ingredients, the extraction product being combined with cosmetic ingredients in addition to the extraction product.

* * * * *